United States Patent
Pugh et al.

(10) Patent No.: US 6,658,423 B1
(45) Date of Patent: Dec. 2, 2003

(54) DETECTING DUPLICATE AND NEAR-DUPLICATE FILES

(75) Inventors: William Pugh, Kensington, MD (US); Monika H. Henzinger, Menlo Park, CA (US)

(73) Assignee: Google, Inc., Mountain View, CA (US)

( * ) Notice: Subject to any disclaimer, the term of this patent is extended or adjusted under 35 U.S.C. 154(b) by 347 days.

(21) Appl. No.: 09/768,947

(22) Filed: Jan. 24, 2001

(51) Int. Cl.[7] ............................ G06F 17/30; G06F 7/00
(52) U.S. Cl. ............................................. 707/102; 707/3
(58) Field of Search ................................ 707/1, 4, 102, 707/203, 3, 6, 103

(56) References Cited

U.S. PATENT DOCUMENTS

| | | | | |
|---|---|---|---|---|
| 5,745,900 A | * | 4/1998 | Burrows | 707/102 |
| 5,778,395 A | * | 7/1998 | Whiting et al. | 707/204 |
| 6,119,124 A | * | 9/2000 | Broder et al. | 707/103 R |
| 6,240,409 B1 | * | 5/2001 | Aiken | 707/4 |
| 6,263,348 B1 | * | 7/2001 | Kathrow et al. | 707/203 |
| 6,505,160 B1 | * | 1/2003 | Levy et al. | 704/270 |

* cited by examiner

Primary Examiner—Frantz Coby
Assistant Examiner—Merilyn Nguyen
(74) Attorney, Agent, or Firm—Straub & Pokotylo; John C. Pokotylo

(57) ABSTRACT

Improved duplicate and near-duplicate detection techniques may assign a number of fingerprints to a given document by (i) extracting parts from the document, (ii) assigning the extracted parts to one or more of a predetermined number of lists, and (iii) generating a fingerprint from each of the populated lists. Two documents may be considered to be near-duplicates if any one of their fingerprints match.

38 Claims, 18 Drawing Sheets

100

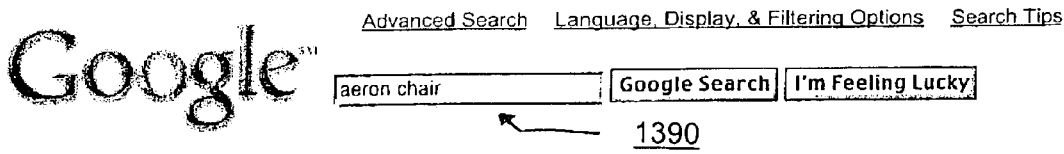

Advanced Search   Language, Display, & Filtering Options   Search Tips

[aeron chair]   [Google Search] [I'm Feeling Lucky]
                         ← 1390

*Tip: Customize Google through our new Language, Display, & Filtering Options page.*

---

Google results 1-10 of about 9,010 for aeron chair. Search took 0.05 seconds.
Categories:   Shopping > Office Products > Furniture > Ergonomic
Business > Industries > Food and Related Products > Grain > Rice > Associations aeron chair. aeron, aerons, ergonomic chairs,
...Care : Chairs : Aeron Chair Monday, July 03 AERON...                ◄——— 1310
... CHAIR - FULLY LOADED $745! FREE Shipping! Herman Miller "AERON"...
www.comfortliving.com/aeron.htm - 20k - Cached - Similar pages aeron chair. aeron, aerons, ergonomic chairs,
...Personal Care : Aeron Chair Monday, July 03 AERON...                ◄——— 1320
... CHAIR - FULLY LOADED $745! FREE Shipping! Herman Miller "AERON"...
www.ahcp.com/aeron_c.htm - 21k - Cached - Similar pages aeron chair. aeron, aerons, ergonomic chairs,
   ...Care : Chairs : Aeron Chair Tuesday, July 04 AERON...             ◄——— 1330
   ... CHAIR - FULLY LOADED $745! FREE Shipping! Herman Miller "AERON"...
   www.ahcp.com/aeron.htm - 20k - Cached - Similar pages
   [ More results from www.ahcp.com ]

Herman Miller AERON Chair from AHC. herman, miller,
...Care : Chairs : Aeron Chair Tuesday, July 04 AERON...                ◄——— 1340
... CHAIR - FULLY LOADED $745! FREE Shipping! Herman Miller "AERON"...
www.4yourback.com/aeron.htm - 20k - Cached - Similar pages aeron chair. aeron, aerons, ergonomic chairs,
...Personal Care : Aeron Chair Tuesday, July 04 AERON...                ◄——— 1350
... CHAIR - FULLY LOADED $745! FREE Shipping! Herman Miller "AERON"...
www.ahcproducts.com/aeron_c.htm - 21k - Cached - Similar pages news | Have A Seat, the Aeron Chair | mpc                          ——— 1360
...> Have A Seat, the Aeron Chair Have A Seat, the Aeron...
...or editing! The Herman Miller Aeron Chair has long been regarded...
www.musicplayer.com/Miller_Freeman/Music_Players_Network/CDA/Home/Article/1,1611,5000685-News,00.html -
15k - Cached - Similar pages

The Herman Miller Aeron Chair @ R35 direct
...presents The Aeron Chair by Herman Miller $750.00 with FREE...        ——— 1370
...Information to a business address. Aeron Chair Product Information...
www.aeron-chair.com/ - 11k - Cached - Similar pages

MCGRAW PUBLISHING PERIPHERALS: The Aeron Chair, a true Sitting
...finish Sitting Machine The Aeron Chair It doesn't look like any...
...extension of the human anatomy, the Aeron Chair echoes the body's...    ◄——— 1380

1330' comfortliving.com
A more.com store

*QuickSearch:*

HOME | PERSONAL CARE | BACK CARE | ALLERGY CARE | BABY CARE
SHOPPING CART | GIFT IDEAS | PRODUCT INDEX | HELP CENTER | FAQ

Home : Back Care : Chairs : Aeron Chair                                                                 Tuesday, July 04

FREE SHIPPING in the entire store! Limited time only

Shop By Category:
CLOSEOUT SPECIALS

Adjustable Beds
Aeron Chair
Bedding
Chairs
  Aeron Chairs
  Dutailier Gliders
  Ergonomic Chairs
  HAG Chairs
  Knee Chairs
  LaFuma
  Lift Chairs
  Massage Chairs
  Office Chairs
  RELAX-R
  Zero-Gravity Chairs
Dutailier Gliders
Equalizer Massagers
Exercise
Foot Care
Get-a-way Chairs
Healthy Back Bag
Herman Miller
Inversion Tables
Lumbar Supports
Magnetic Therapy
Massage Loungers
Massagers
Mattresses
  Overlays

AERON CHAIR - FULLY LOADED $745!
FREE Shipping!

▶ Herman Miller "AERON" Chair

Through advanced ergonomic design, the aeron chair sets a new standard to comfortable, healthful seating. Quite simply, it does what office seating has never before done. The Herman Miller aeron chair is designed to fit. Office chairs are traditionally designed to accommodate an average-sized person. Such chairs comfortably fit 50-60 percent of today's user population. The aeron chair comes in three sizes, small (A), medium (B) and large (C) - all with identical performance capabilities. The Pellicle suspension provides healthful support in all sitting postures, as the patented Pellicle material equitably distributes body weight on the seat and back. The material lets air pass through for comfort in any work environment. The distinctive appearance of the Herman Miller aeron chair is an expression of its unique capabilities and innovative materials.

Fully Loaded: Complete with two stage pneumatic tilt limiter and seat angle, padded adjustable arms and an adjustable lumbar support.

Three sizes: A, B or C.

FIGURE 17

1340' comfortliving.com
A more.com store

QuickSearch:

HOME | PERSONAL CARE | BACK CARE | ALLERGY CARE | BABY CARE
SHOPPING CART | GIFT IDEAS | PRODUCT INDEX | HELP CENTER | FAQ

Tuesday, July 04

Home : Back Care : Chairs : Aeron Chair

FREE SHIPPING in the entire store! *Limited time only*

AERON CHAIR - FULLY LOADED $745!
FREE Shipping!

▶ Herman Miller "AERON" Chair

Shop By Category
CLOSEOUT SPECIALS

Adjustable Beds
Aeron Chair
Bedding
Chairs
  Aeron Chairs
  Dutailier Gliders
  Ergonomic Chairs
  HAG Chairs
  Knee Chairs
  LaFuma
  Lift Chairs
  Massage Chairs
  Office Chairs
  RELAX-R
  Zero-Gravity Chairs
Dutailier Gliders
Equalizer Massagers
Exercise
Foot Care
Get-a-way Chairs
Healthy Back Bag
Herman Miller
Inversion Tables
Lumbar Supports
Magnetic Therapy
Massage Loungers
Massagers
Mattresses
  Overlays Through advanced ergonomic design, the aeron chair sets a new standard to comfortable, healthful seating. Quite simply, it does what office seating has never before done. The Herman Miller aeron chair is designed to fit. Office chairs are traditionally designed to accommodate an average-sized person. Such chairs comfortably fit 50-60 percent of today's user population. The aeron chair comes in three sizes, small (A), medium (B) and large (C) - all with identical performance capabilities. The Pellicle suspension provides healthful support in all sitting postures, as the patented Pellicle material equitably distributes body weight on the seat and back. The material lets air pass through for comfort in any work environment. The distinctive appearance of the Herman Miller aeron chair is an expression of its unique capabilities and innovative materials.

Fully Loaded: Complete with two stage pneumatic tilt limiter and seat angle, padded adjustable arms and an adjustable lumbar support.

Three sizes: A, B or C.

Home : Personal Care : Aeron Chair

Tuesday, July 04

FREE SHIPPING in the entire store! Limited time only

AERON CHAIR – FULLY LOADED $745!
FREE Shipping!

▶ Herman Miller "AERON" Chair

SHOP BY CATEGORY!
COMFORT GIFTS!

Personal Care
 Oral Care
  Panasonic
  Braun Oral-B
  Interplak
  Emjoi
  Sonicare
  Homedics
  Sonipick
  Scales/Fat Analyzers
 Shavers
  Braun
  Eltron
  Emjoi
  EpiLady
  Grundig
  Norelco
  Panasonic
  Philips
  Remington
 Skin Care
Electronics
 CD Players
 MP3 Players
 DVD Players
 Nikon Binoculars
 Phones
 Video
Ergonomics Through advanced ergonomic design, the aeron chair sets a new standard to comfortable, healthful seating. Quite simply, it does what office seating has never before done. The Herman Miller aeron chair is designed to fit. Office chairs are traditionally designed to accommodate an average-sized person. Such chairs comfortably fit 50-60 percent of today's user population. The aeron chair comes in three sizes, small (A), medium (B) and large (C) – all with identical performance capabilities. The Pellicle suspension provides healthful support in all sitting postures, as the patented Pellicle material equitably distributes body weight on the seat and back. The material lets air pass through for comfort in any work environment.
The distinctive appearance of the Herman Miller aeron chair is an expression of its unique capabilities and innovative materials.

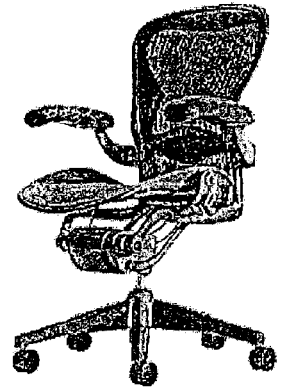

Fully Loaded: Complete with two stage pneumatic tilt limiter and seat angle, padded adjustable arms and an adjustable lumbar support.

Three sizes: A, B or C.

DETECTING DUPLICATE AND NEAR-DUPLICATE FILES

§1. BACKGROUND OF THE INVENTION

§1.1 Field of the Invention

The present invention concerns information management and retrieval in general. More specifically, the present invention concerns detecting, and optionally removing, duplicate and near-duplicate information or content, such as in a repository of documents to be searched for example.

§1.2 Related Art

In the following, the term "document(s)" should be broadly interpreted and may include content such as Web pages, text files, multimedia files, object features, link structure, etc. Also, it should be noted that when near-duplicate documents are detected, exact duplicate documents will also be detected as a consequence (though such exact duplicates might not necessarily be distinguished from near-duplicates).

Detecting near-duplicate documents has many potential applications. For example, duplicate or near-duplicate documents may indicate plagiarism or copyright infringement. One important application of near-duplicate document detection is in the context of information storage and retrieval.

Efficient techniques to detect documents that are exact duplicates exist. Detecting whether or not documents are near-duplicates is more difficult, particularly in large collections of documents. For example, the Internet, collectively, includes literally billions of "Web site" documents.

Sources of duplicate and near-duplicate documents on the Internet are introduced in §1.2.1 below. Then, problems that these duplicate and near-duplicate documents raise, both for end-users and for entities assisting end-users, are introduced in §1.2.2 below. Finally, previous techniques for detecting duplicate and near-duplicate documents in the context of large document collections, as well as perceived shortcomings of such techniques, are introduced in §1.2.3 below.

§1.2.1 SOURCES OF DUPLICATE AND NEAR-DUPLICATE DOCUMENTS ON THE INTERNET

On the Internet, the World Wide Web (referred to as "the Web") may include the same document duplicated in different forms or at different places. (Naturally, other networks, or even stand alone systems, may have duplicate documents.) Sources of such duplication are introduced here.

First, some documents are "mirrored" at different sites on the Web. Such mirroring is used to alleviate potential delays when many users attempt to request the same document at the same time, and/or to minimize network latency (e.g., by caching Web pages locally).

Second, some documents will have different versions with different formatting. For example, a given document may have plain text and HTML (hyper-text markup language) versions so that users can render or download the content in a form that they prefer. As more and more different devices (e.g., computers, mobile phones, personal digital assistants, etc.) are used to access the Internet, a given document may have more and more different versions with different formatting (text only, text plus other media, etc.).

Third, documents are often prepended or appended with information related to its location on the Web, the date, the date it was last modified, a version, a title, a hierarchical classification path (e.g., a Web page may be classified under more than one class within the hierarchy of a Web site), etc. An example of such near-duplicate documents is illustrated in §4.4 below, with reference to FIGS. 13 through 18.

Fourth, in some instances a new document is generated from an existing document using a consistent word replacement. For example, a Web site may be "re-branded" for different audiences by using word replacement.

Finally, some Web pages aggregate or incorporate content available from another source on the Web.

§1.2.2 PROBLEMS RAISED BY DUPLICATE AND NEAR-DUPLICATE DOCUMENTS

Duplicate and near-duplicate documents raise potential problems for both people accessing information (e.g., from the Web) and entities helping people to access desired information (e.g., search engine companies). These potential problems are introduced below.

Although people continue to use computers to enter, manipulate and store information, in view of developments in data storage, internetworking (e.g., the Internet), and interlinking and cross referencing of information (e.g., using hyper-text links), people are using computers (or more generally, information access machines) to access information to an ever increasing extent.

Search engines have been employed to help users find desired information. Search engines typically search data-based content or "Web sites" pursuant to a user query. In response to a user's query, a rank-ordered list, which typically includes brief descriptions of the uncovered content, as well as hyper-texts links (i.e., text, having associated URLs) to the uncovered content, is returned. The rank-ordering of the list is typically based on a match between words appearing in the query and words appearing in the content.

From the perspective of users, duplicate and near-duplicate documents raise problems. More specifically, when users submit a query to a search engine, most do not want links to (and descriptions of) Web pages which have largely redundant information. For example, search engines typically respond to search queries by providing groups of ten results. If pages with duplicate content were returned, many of the results in one group may include the same content. Thus, there is a need for a technique to avoid providing search results associated with (e.g., having links to) Web pages having duplicate content.

From the perspective of entities hosting search engines, duplicate and near-duplicate documents also raise problems—giving end-users what they want, being one of them. To appreciate some of the other potential problems raised by duplicate and near-duplicate documents, some search engine technology is introduced first.

Most search engines perform three main functions: (i) crawling the Web; (ii) indexing the content of the Web; and (iii) responding to a search query using the index to generate search results. Given the large amount of information available, these three main functions are automated to a large extent. While the crawl operation will associate words or phrases with a document (e.g., a Web page), the indexing operation will associate document(s) (e.g., Web page(s)) with words or phrases. The search operation then (i) uses that index to find documents (e.g., Web pages) containing various words of a search query, and (ii) ranks or orders the documents found in accordance with some heuristic(s).

Recall that the Web may include the same documents duplicated in different forms or at different places on the Web. For example, as introduced in §1.2.1 above, documents may be "mirrored" at different sites on the Web, documents may have a number of different formats so that users can render or download the content in a form that they prefer, documents may have a different versions with different information prepended or appended, some documents may have been generated from others using consistent word replacement, and some documents may aggregate or incorporate documents available from another source on the Web. It would be desirable to eliminate such duplicates or near-duplicates. Aside from eliminating duplicate or near-duplicate documents to meet user expectations and wishes, eliminating duplicate or near-duplicate documents is desirable to search engine hosting entities to (i) reduce storage requirements (e.g., for the index and data structures derived from the index), and (ii) reduce resources needed to process indexes, queries, etc.

In view of the foregoing, techniques to detect (and eliminate) near-duplicate documents are needed.

§1.2.3 KNOWN TECHNIQUES FOR DETECTING DUPLICATE AND NEAR-DUPLICATE DOCUMENTS

Some previous techniques for detecting duplicate and near-duplicate documents involve generating so-called "fingerprints" for elements (e.g., paragraphs, sentences, words, or shingles (i.e., overlapping stretches of consecutive words)) of documents. See, e.g., the articles: A. Z. Broder, "On the Resemblance and Containment of Documents," *Proceedings of Compression and Complexity of Sequences* 1997, pp. 21–27, IEEE Computer Society (1988); and S. Brin et al., "Copy Detection Mechanisms for Digital Documents," *Proceedings of the ACM SIGMOD Annual Conference, San Jose* 1995 (May 1995). Some or all of the generated fingerprints could be used in a duplicate/near-duplicate determination. More specifically, two documents would be considered to be near-duplicates if they share more than a predetermined number (at least two, and generally much higher) of fingerprints. That is, such methods determine when documents share multiple common fingerprints. Generally, if the predetermined number is too low, too many false positives would be generated.

For a large collection of documents (e.g., billions of documents to be indexed by a search engine), this determination becomes quite expensive, computationally and in terms of storage. See, e.g., the article, M. Fang et al., "Computing Iceberg Queries Efficiently," *Proc. $24^{th}Int'l.$ Conf. On Very Large Databases*, pp. 299–310 (1998). This problem is not easily overcome. For example, it is not especially useful to "preprocess" the representations of such documents used in the Broder technique to eliminate from further consideration, fingerprints known to be unique. This is because even documents with non-unique fingerprints (i.e., documents remaining after such preprocessing) may, nonetheless, have no near-duplicate documents. Thus, a better duplicate/near-duplicate determination technique is needed.

§2. SUMMARY OF THE INVENTION

The present invention may detect near-duplicate documents by (i) for each document, generating fingerprints, (ii) determining near-duplicate documents based on the fingerprints. In one embodiment, the fingerprints may be preprocessed to eliminate those that only occur in one document. In such an embodiment, only the remaining fingerprints would be used when determining near-duplicate documents.

The act of generating fingerprints for each document may be effected by (i) extracting parts (e.g., words) from the documents, (ii) hashing each of the extracted parts to determine which of a predetermined number of lists is to be populated with a given part, and (iii) for each of the lists, generating a fingerprint.

In response to the detected duplicate documents, the present invention may also function to eliminate duplicate documents.

The present invention may function to generate clusters of near-duplicate documents, in which a transitive property is assumed. Each document may have an identifier for identifying a cluster with which it is associated. In this alternative, in response to a search query, if two candidate result documents belong to the same cluster and if the two candidate result documents match the query equally well, only the one deemed more likely to be relevant (e.g., by virtue of a high Page rank, being more recent, etc.) is returned.

In the context of a search engine, the present invention may also be used during a crawling operation to speed up the crawling and to save bandwidth by not crawling near-duplicate Web pages or sites, as determined from documents uncovered in a previous crawl. Further, by reducing the number of Web pages or sites crawled, the present invention can be used to reduce storage requirements of downstream stored data structures. The present invention may also be used after the crawl such that if more than one document are near duplicates, then only one is indexed. The present invention can instead be used later, in response to a query, in which case a user is not annoyed with near-duplicate search results. The present invention may also be used to "fix" broken links. That is, if a document (e.g., a Web page) doesn't exist (at a particular location or URL) anymore, a link to a near-duplicate page can be provided.

§3. BRIEF DESCRIPTION OF THE DRAWINGS

Figure 12A:
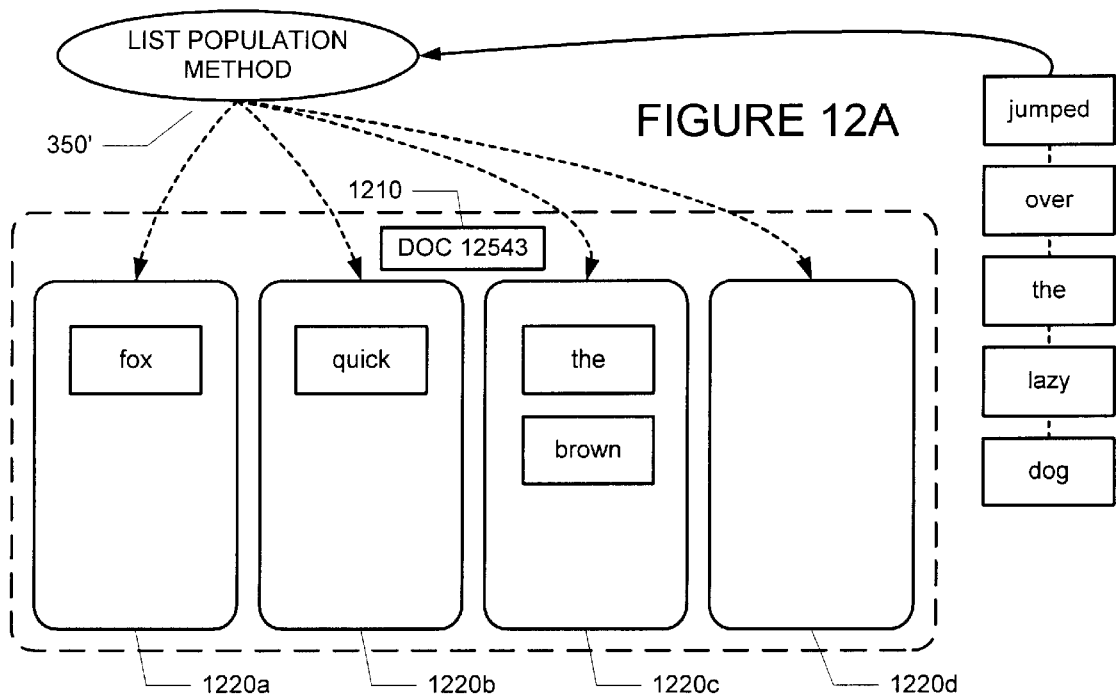
Figure 12B:
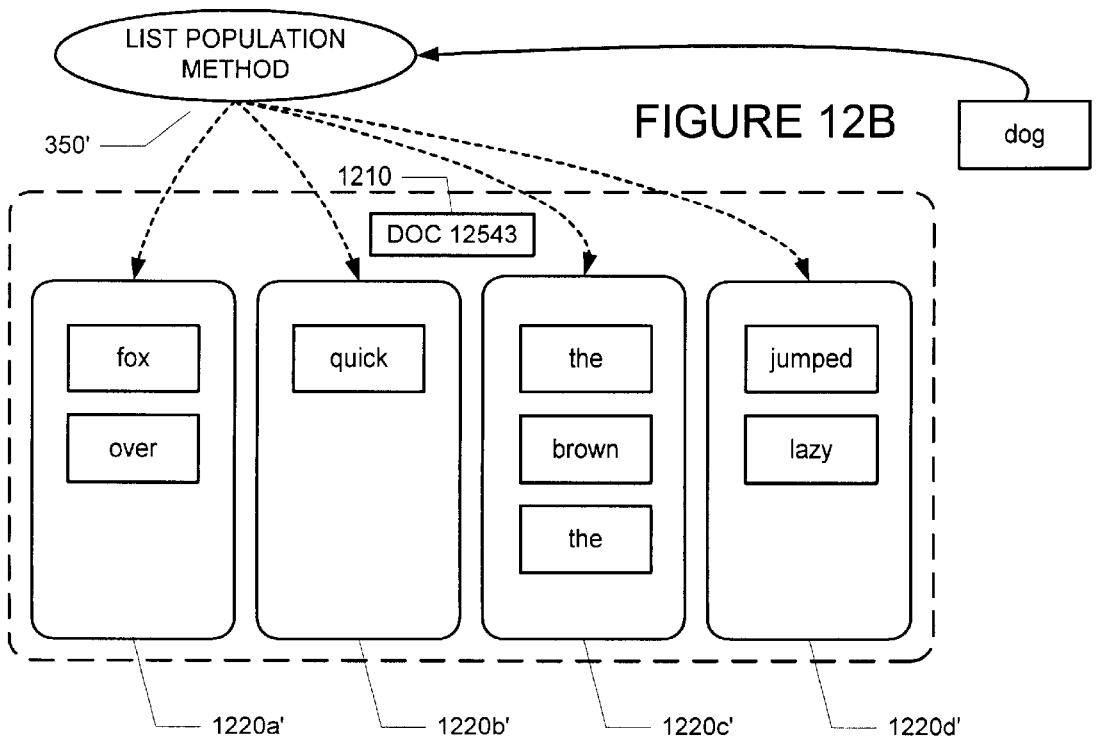

FIGS. 12A and 12B, collectively, provide an example illustrating an operation of an exemplary list population operation.

FIG. 13 illustrates a Web page of results to a search query.

FIGS. 14 through 18 illustrate near-duplicate documents that would be (related to snippets and hyper-text links) returned if near-duplicate documents were not detected and eliminated.

§4. DETAILED DESCRIPTION

The present invention involves novel methods, apparatus and data structures for identifying near-duplicate documents. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the present invention is not intended to be limited to the embodiments shown and the inventor regards his invention as the following disclosed methods, apparatus, articles of manufacturers, and data structures and any other patentable subject matter to the extent that they are patentable.

In the following, environments in which the present invention may be employed are introduced in §4.1. Then, functions that may be performed by the present invention are introduced in §4.2. Then, operations, data structures, methods and apparatus that may be used to effect those functions are described in §4.3. Thereafter, examples of how exemplary parts of the present invention may operate is described in §4.4. Finally, some conclusions about the present invention are set forth in §4.5.

§4.1 EXEMPLARY ENVIRONMENTS IN WHICH INVENTION MAY OPERATE

The following exemplary embodiments are presented to illustrate examples of utility of the present invention and to illustrate examples of contexts in which the present invention may operate. However, the present invention can be used in other environments and its use is not intended to be limited to the exemplary environment 100 and search facility 200 introduced below with reference to FIGS. 1 and 2, respectively.

Figure 1:
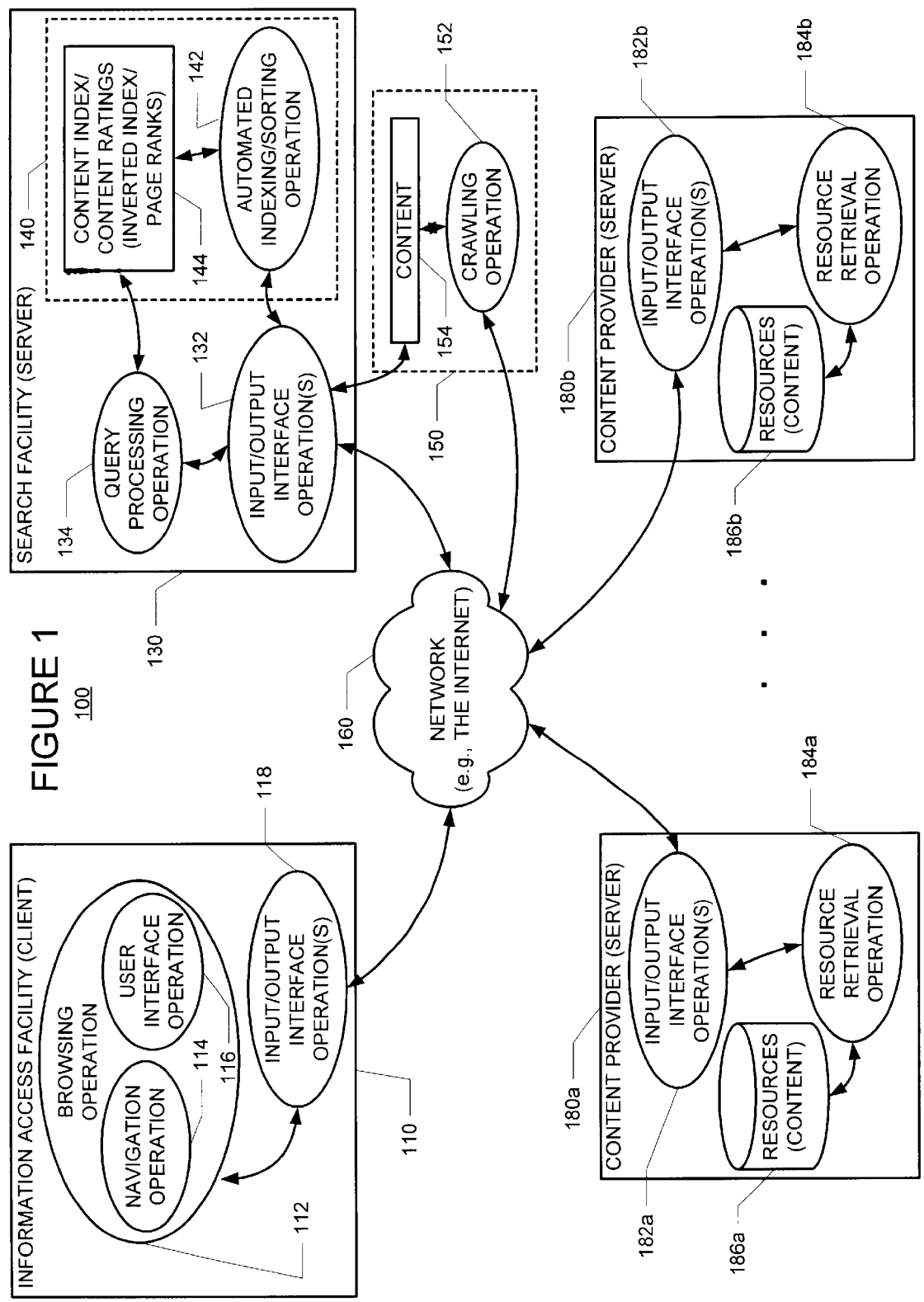
FIG. 1 is a high-level block diagram of an environment in which at least some aspects of the present invention may be used.

FIG. 1 is a high-level block diagram of an environment 100 in which at least some aspects of the present invention may be used. This environment 100 may be a network (such as the Internet for example) 160 in which an information access facility (client) 110 is used to render information accessed from one or more content providers (servers) 180. A search facility (server) 130 may be used by the information access facility 110 to search for content of interest.

The information access facility 110 may include a browsing operation 112 which may include a navigation operation 114 and a user interface operation 116. The browsing operation 112 may access the network 160 via input/output interface operations 118. For example, in the context of a personal computer, the browsing operation 112 may be a browser (such as "Internet Explorer" from Microsoft Corporation of Redmond, Wash., or "Netscape" from Netscape Communications, Inc.) and the input/output interface operations may include a modem or network interface card (or NIC) and networking software. Other examples of possible information access facilities 110 include untethered devices, such as personal digital assistants and mobile telephones for example, set-top boxes, kiosks, etc.

Each of the content providers 180 may include stored resources (also referred to as content) 136, a resource retrieval operation 184 that accesses and provides content in response to a request, and input/output interface operation(s) 182. These operations of the content providers 180 may be effected by computers, such as personal computers or servers for example. Accordingly, the stored resources 186 may be embodied as data stored on some type of storage medium such as a magnetic disk(s), an optical disk(s), etc. In this particular environment 100, the term "document" may be interpreted to include addressable content, such as a Web page for example.

The search facility 130 may perform crawling, indexing/sorting, and query processing functions. These functions may be performed by the same entity or separate entities. Further, these functions may be performed at the same location or at different locations. In any event, at a crawling facility 150, a crawling operation 152 gets content from various sources accessible via the network 160, and stores such content, or a form of such content, as indicated by 154. Then, at an automated indexing/sorting facility 140, an automated indexing/sorting operation 142 may access the stored content 154 and may generate a content index (e.g., an inverted index, to be described below) and content ratings (e.g., PageRanks, to be described below) 140. Finally, a query processing operation 134 accepts queries and returns query results based on the content index (and the content ratings) 140. The crawling, indexing/sorting and query processing functions may be performed by one or more computers.

Figure 2:
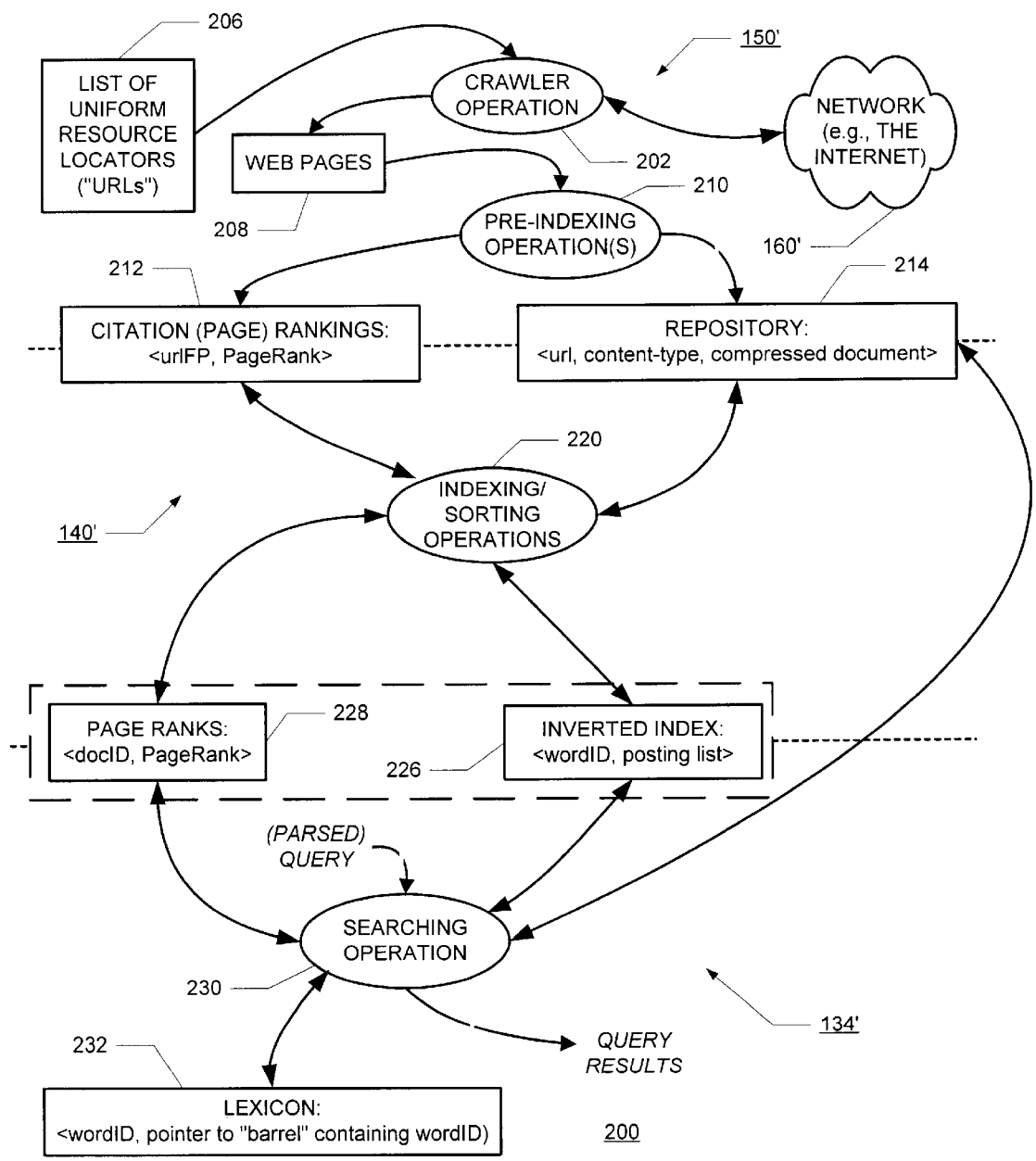
FIG. 2 is a process bubble diagram of an advanced search facility in which at least some aspects of the present invention may be used.

Although the present invention may be used with a number of different types of search engines, the present inventor anticipates that it will be used with an advanced search facility, such as the one presently available from Google, Inc. of Mountain View, Calif. FIG. 2 is a process bubble diagram of such an advanced search facility 200 in which at least some aspects of the present invention may be used.

The advanced search facility 200 illustrated in FIG. 2 performs three main functions: (i) crawling; (ii) indexing/sorting; and (iii) searching. The horizontal dashed lines divide FIG. 2 into three parts corresponding to these three main functions. More specifically, the first part 150' corresponds to the crawling function, the second part 140' corresponds to the indexing/sorting function, and the third part 134' corresponds to the search (or query processing) function. (Note that an apostrophe "'" following a reference number is used to indicate that the referenced item is merely one example of the item referenced by the number without an apostrophe.) Each of these parts is introduced in more detail below. Before doing so, however, a few distinguishing features of this advanced search facility 200 are introduced.

The advanced search facility uses the link structure of the Web, as well as other techniques, to improve search results. (See, e.g., the article S. Brin and L. Page, "The Anatomy of a Large-Scale Hypertextual Search Engine," *Seventh International World Wide Web Conference*, Brisbane, Australia. Incorporated herein by reference.)

Referring back to FIG. 2, the three main parts of the advanced search engine 200 are now described further.

The crawling part 150' may be distributed across a number of machines. A single URLserver (not shown) serves lists of uniform resource locations ("URLs") 206 to a number of crawlers. Based on this list of URLs 206, the crawling operation 202 crawls the network 160' and gets Web pages 208. A pre-indexing operation 210 may then generate page rankings 212, as well as a repository 214 from these Web pages 208. The page rankings 212 may include a number of URL fingerprint (i.e., a unique value), Page rank value (as introduced above) pairs. The repository 214 may include URL, content type and compressed page triples.

Regarding the indexing/sorting part 140', the indexing/sorting operations 220 may generate an inverted index 226. The indexing/sorting operations 220 may also generate page ranks 228 from the citation rankings 212. The page ranks 228 may include document ID, PageRank value pairs.

Regarding the query processing part 134', the searching operations 230 may be run by a Web server and may use a lexicon 232, together with the inverted index 226 and the PageRanks 228, to generate query results in response to a query. The query results may be based on a combination of (i) information derived from PageRanks 228 and (ii) information derived from how closely a particular document matches the terms contained in the query (also referred to as the information retrieval (or "IR") component). Having described exemplary environments in which the present invention may be used, functions that may be performed by the present invention are now introduced in §4.2 below.

§4.2 FUNCTIONS THAT MAY BE PERFORMED BY THE PRESENT INVENTION

One goal of the present invention is to provide a better near-duplicate determination technique. Such a technique should be less computationally expensive than the prior techniques introduced in §1.2.3 above. Such a technique should not generate too many false positives (i.e., false indications that documents are duplicates or near-duplicates when, in fact, they are not). The present invention should also be able to detect documents that are duplicates or near-duplicates, but that include a consistent word replacement, as introduced in §1.2.1 above.

At a high level, the present invention may function to detect near-duplicate documents (e.g., Web pages). To reiterate, it will be presumed that detecting near-duplicate document will necessarily also detect exact duplicate documents. Therefore, when the term "near-duplicate detection" is used, it will be understood that exact duplicates will also be detected, though not necessarily identified as "exact", as opposed to near, duplicates. The present invention may detect near-duplicate documents by (i) for each document, generating fingerprints, (ii) preprocessing (optionally) the fingerprints to eliminate those that only occur in one document, and (iii) determining near-duplicate documents based on the (remaining) fingerprints. The act of generating fingerprints for each document may be effected by (i) extracting parts (e.g., words) from the documents, (ii) hashing each of the extracted parts to determine which of a predetermined number of lists is to be populated with a given part, and (iii) for each of the lists, generating a fingerprint.

In response to the detected duplicate documents, the present invention may also function to eliminate duplicate documents (e.g., keeping the one with best PageRank, with best trust of host, that is the most recent) Alternatively, the present invention may function to generate clusters of near-duplicate documents, in which a transitive property is assumed (i.e., if document A is a near-duplicate of document B, and document B is a near-duplicate of document C, then document A is considered a near-duplicate of document C). Each document may have an identifier for identifying a cluster with which it is associated. In this alternative, in response to a search query, if two candidate result documents belong to the same cluster and if the two candidate result documents match the query equally well (e.g., have the same title and/or snippet) if both appear in the same group of results (e.g., first page), only the one deemed more likely to be relevant (e.g., by virtue of a high PageRank, being more recent, etc.) is returned.

In the context of a search engine, the present invention may also be used during a crawling operation 202 to speed up the crawling and to save bandwidth by not crawling near-duplicate Web pages or sites, as determined from documents uncovered in a previous crawl. Further, by reducing the number of Web pages or sites crawled, the present invention can be used to reduce storage requirements for other "downstream" stored data structures. Alternatively, the present invention may be used after crawling such that, if there are more two or more near duplicate documents, only one is indexed. The present invention can instead be used later, in response to a query, in which case a user is not annoyed with near-duplicate search results. The present invention may also be used to "fix" broken links. That is, if a document (e.g., a Web page) doesn't exist (at a particular location or URL) anymore, a link to a near-duplicate page can be provided.

Having introduced functions that may be performed by the present invention, exemplary operations, data structures, methods and apparatus for effecting these functions are described in §4.3 below.

§4.3 EXEMPLARY OPERATIONS, DATA STRUCTURES, METHODS AND APPARATUS FOR EFFECTING FUNCTIONS THAT MAY BE PERFORMED BY THE PRESENT INVENTION

In the following, exemplary operations that may be performed by the present invention, and exemplary data structures that may be used by the present invention, are introduced in §4.3.1 with reference to FIG. 3. Then, exemplary methods for effecting such operations are described in §4.3.2 with reference to FIGS. 4 through 9. Finally, exemplary apparatus that may be used to effect the exemplary processes and store the exemplary data structures are described in §4.3.3 with reference to FIG. 10.

§4.3.1 EXEMPLARY OPERATIONS AND DATA STRUCTURES

Figure 3:
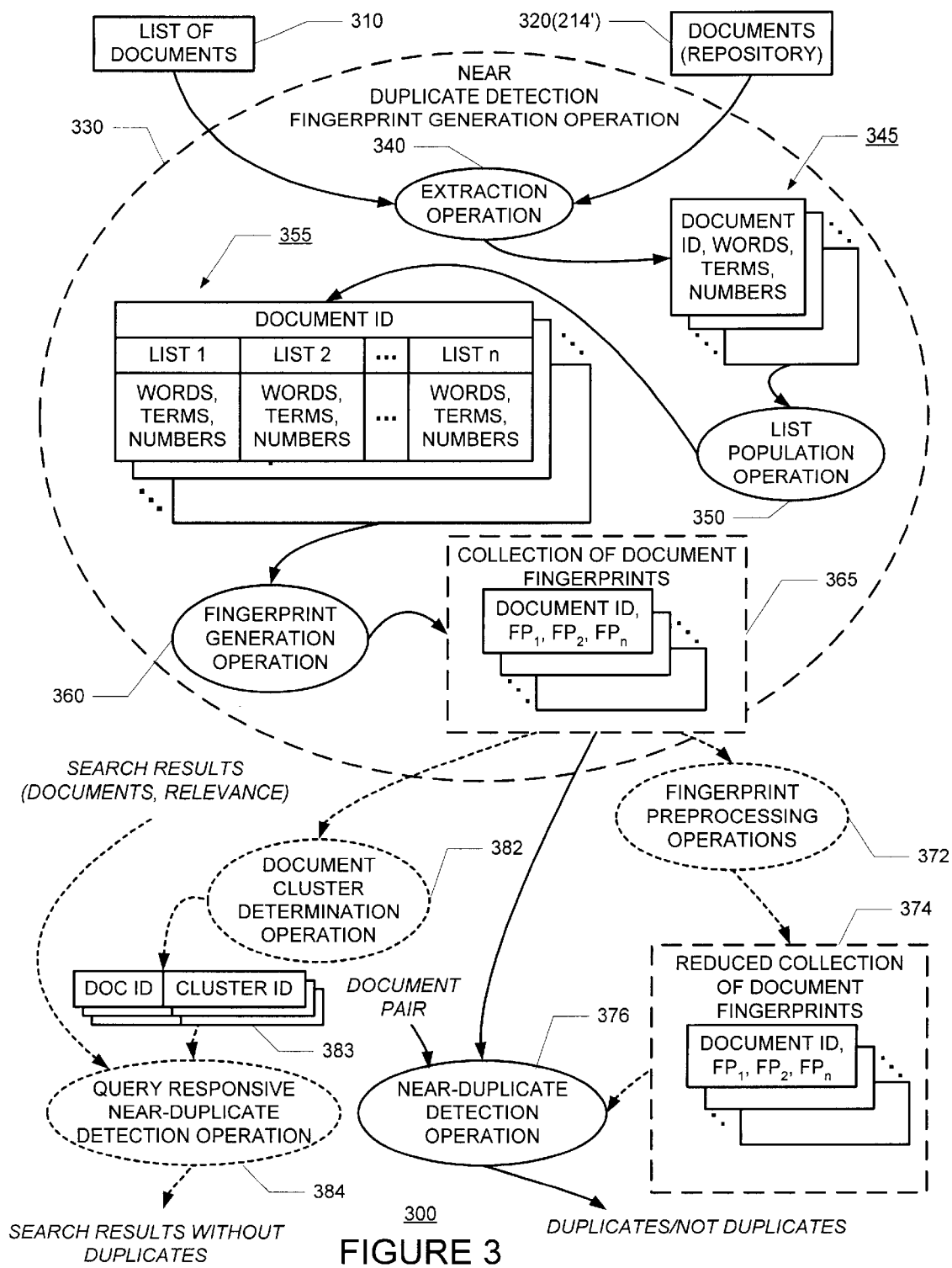
FIG. 3 is a process bubble diagram that illustrates some operations that may be performed by the present invention.

FIG. 3 is a process bubble diagram that illustrates operations that may be performed by the present invention. A near-duplicate detection fingerprint generation operation 330 may be used to generate a plurality of fingerprints 365 for each of a number of documents 320/214'. More specifically, an extraction operation 340 may be used to extract parts (e.g., words, terms, numbers, etc.) from documents, and associate a document identifier with the extracted parts, as indicated by 345 (each record including a document identifier and associated extracted parts may be referred to as "document extracted parts"). Exemplary methods for effecting the extraction operation 340 are described in §4.3.2.1 below with reference to FIG. 4. An example illustrating the operation of an exemplary extraction operation 340 is provided in §4.4 below with reference to FIG. 11. The documents 320 may be accepted from any source, such as the repository 214' of the search engine 200 of FIG. 2. The documents 320 to be processed may be identified in a list 310.

A list population operation 350 may be used to process the document extracted parts 345 and place each extracted part 345 into one of a predetermined number (e.g., four) of lists 355 (each record including a document identifier and associated lists may be referred to as "document lists"). In the context of comparing the text of web pages, it is expected that three to eight lists, will yield good results. Good results have been obtained in this context using three lists and four lists. In the context of a context vectors of words for use in a "thesaurus" application, good results have been obtained with three lists and with nine lists. Thus, a document identifier will be associated with a predetermined number of lists, each of the lists being populated (though some lists may be empty) with extracted document parts. The list population operation 350 may use a hash function that is repeatable, deterministic, and not sensitive to state. For example, the word "the" will always be sent to the same list, without regard to the number of times it occurs in a document, and without regard to which document it occurs in. Exemplary methods for effecting the list population operation 350 are described in §4.3.2.2 below with reference to FIG. 5. An example illustrating the operation of an exemplary list population operation 350 is provided in §4.4 below with reference to FIGS. 12A and 12B.

A fingerprint generation operation 360 may be used, for each document, to process the populated document lists 355 to generate a fingerprint for each of the lists (each record including a document identifier and associated fingerprints may be referred to as "document fingerprints"). Exemplary methods for effecting the fingerprint generation operation 360 are described in §4.3.2.3 below with reference to FIG. 6. Thus, a document identifier will be associated with a predetermined number (e.g., four) of fingerprints as indicated by 365. The predetermined number of fingerprints may correspond to the predetermined number of lists. The fingerprint generation operation 360 should be designed such that it is very unlikely that two different lists would produce the same fingerprint, but such that two identical lists will always generate the same fingerprint.

Once the document fingerprints 365 for each of a number of documents is determined, a near-duplicate detection operation 376 may be used to determine whether or not any two documents are "near-duplicates". In one embodiment of the invention, if two documents have any one fingerprint in common, they are considered to be "near-duplicates". If each of the fingerprints are the same, the two documents could be considered to be "exact-duplicates". Exemplary methods for effecting the near-duplicate detection operation 376 are described in §4.3.2.4 below with reference to FIG. 7.

Having described operations that may be performed in an exemplary embodiment of the present invention, some optimizations to such operations and alternative operations are now introduced.

§4.3.1.1 REDUCING THE SIZE OF THE COLLECTION OF DOCUMENT FINGERPRINTS

A very large collection of documents 320 will generate a very large collection of document fingerprints 365. Reducing the size of the collection of document fingerprints 365 without impacting the efficacy of the near-duplicate detection operation 376 is clearly desirable. One or more fingerprint preprocessing operations 372 may be used for this purpose. For example, a fingerprint preprocessing operation 372 may be used to eliminate fingerprints that only occur in a single document, leaving only those fingerprints occurring in more than one document 374. Such fingerprints may be removed since, in accordance with one embodiment of the near-duplicate detection operation 376, they will never indicate a near-duplicate document because they have no matching fingerprint in another document. Note that if such a fingerprint preprocessing operation 372 is used, then the near-duplicate detection operation 376 may use a reduced collection of document fingerprints 374, rather than the full collection 365. Alternatively, a near-duplicate detection operation other than that of the present invention may be used. That is, the present invention may be used solely for generating a reduced collection of document fingerprints 374. Any near-duplicate detection technique may then operate on such a reduced collection.

Similarly, the techniques of the present invention can be used as a pre-filtering step in a more careful and (e.g., computationally and/or storage) expensive near-duplicate determination technique. In this way, pairs of objects (e.g., documents) indicated by the technique of the present invention as being near-duplicates would be checked using the second, more careful, near-duplicate determination technique. Pairs indicated by the technique of the present invention as not being near-duplicates would simply be discarded. Naturally, in such a pre-filtering application, the present invention could be tuned to err on the side of generating false positive near-duplicate indications.

§4.3.1.2 GENERATING AND USING CLUSTERS OF NEAR-DUPLICATE DOCUMENTS

The notion of near-duplicate documents can be extended to have a transitive property. That is, in such a case, if document A is a near-duplicate of document B, which is a near-duplicate of document C, then A is considered to be a near-duplicate of document C (even if a near-duplicated detection operation 376 would not otherwise consider documents A and C to be near-duplicates). A document cluster determination operation 382 (e.g., a known union-find technique) may be used to define clusters of documents in this way. Note that a document will only belong to a single cluster—if it belonged to two separate clusters, the two clusters could be combined into one by virtue of the common document. A data structure 383 associating a document (e.g., a document identifier) with a cluster (e.g., a cluster identifier) may be used to reflect the clusters determined. These clusters of near-duplicate documents may be used as follows. Exemplary methods that may be used to effect this clustering operation 382 are described in §4.3.2.5 below with reference to FIG. 8.

In the context of a search application, a search operation will often return search results in response to a query. (See, e.g., FIG. 2.) The search results may be grouped into a predetermined number (e.g., ten) of search results (e.g., snippets of documents with hyper-text links to the documents). A query-responsive duplicate detection operation 384 may function as follows. If the search results include two documents that belong to the same cluster, and those two documents match (in terms of traditional information retrieval) the query equally well, then only the higher quality document (e.g., more recent, higher PageRank, more relevant, etc.) is kept, the other being eliminated. Exemplary methods that may be used to effect the query-responsive duplicate detection operation 384 are described in §4.3.2.5 below with reference to FIG. 9. An example illustrating the operation of an exemplary query-responsive duplicate detection operation 384 is described in §4.4 below with reference to FIGS. 13 through 18.

§4.3.2 EXEMPLARY METHODS

Exemplary methods that may be used to effect some of the operations introduced in §4.3.2 above, are now described in §§4.3.2.1 through 4.3.2.5.

§4.3.2.1 EXEMPLARY EXTRACTION METHODS

Figure 4:
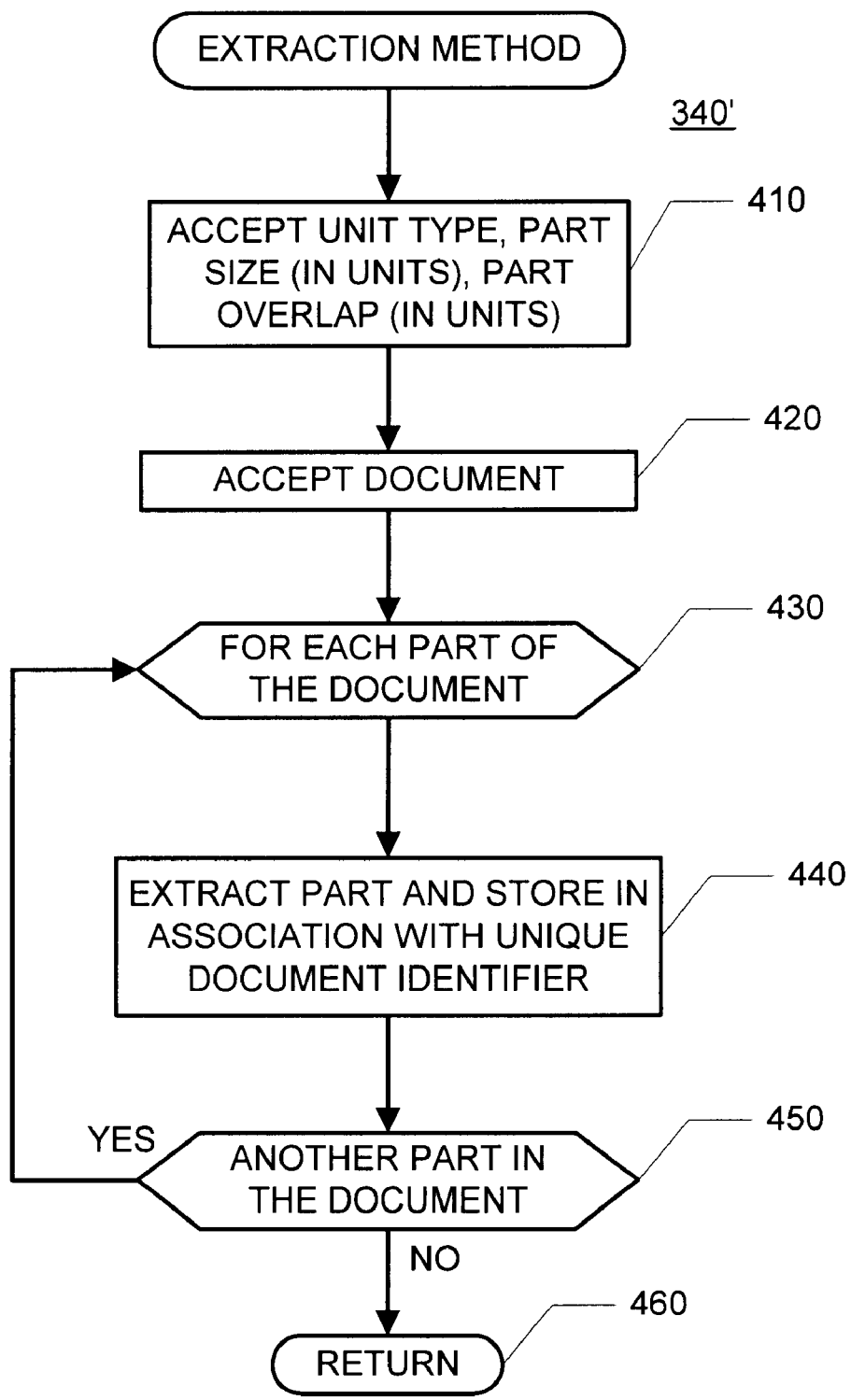
FIG. 4 is a high-level flow diagram of an exemplary method that may be used to effect an extraction operation.

FIG. 4 is a high-level flow diagram of an exemplary method 340' that may be used to effect the extraction operation 340. As indicated by block 410 unit type (e.g., word, sentence, character, paragraph, section, etc.), part size (as a number of units) and part overlap (e.g., no overlap or shingles defined by an overlap having a predetermined of units) may be accepted. These parameters are tunable, but once set, should be applied consistently across all documents to be checked to determine whether or not any are near-duplicates. As indicated in block 420, a document is accepted. Then, as indicated by the loop 430–450 through all parts of the document, parts are extracted and stored in association with a unique document identifier (referred to as "doc ID"). After all of the parts of a document have been processed, the method 340' is left via RETURN node 460. Note that the extraction method 340' may be applied to some or all documents of a collection to be analyzed.

Referring back to block 440, extraction may be effected using any one of a number of known techniques. Referring back to block 410, the parts to be extracted from a document may be sections, paragraphs, sentences, words, or characters for example. See, e.g., the article, S. Brin et al., "Copy Detection Mechanisms for Digital Documents," *Proceedings of the ACM SIGMOD Annual Conference*, San Jose (May 1995), downloaded from www-db.Stanford.edu/~sergey/copy.html on Nov. 27, 2000 (hereafter referred to as "the Brin article").

Before extraction occurs, a document may be preprocessed to remove formatting information and non-textual components thereby generating a so-called "canonical form" document consisting of ASCII characters with white-space separating words, punctuation separating sentences, etc. See, e.g., the Brin article.

If the document is not a text document, or if it includes non-textual components, other features may be extracted using known techniques. Further, the techniques of the present invention can be used in other applications in which some measure of similarity is needed. For example, in the context of providing a thesaurus operation, words which have similar (e.g., near-duplicate) "context vectors" may be considered synonyms. A context vector of a given word may be thought of as words that frequently (e.g., at least a predetermined number of times) appear close to (e.g., within a predetermined proximity of) the word in the given collection of documents.

The extraction operation 340 may be modified so that short or common words or terms (e.g., stop words) are not processed (i.e., ignored or removed by preprocessing).

The extraction operation 340 may be modified so that short documents (e.g., documents with 50 words or less) are not processed at all. For example, standard error pages (e.g., informing a user about a dead link, etc.) are typically short, and should not be processed.

An exemplary operation of an exemplary extraction operation 340 is described in §4.4 below with reference to FIG. 11.

§4.3.2.2 EXEMPLARY LIST POPULATION METHODS

Figure 5:
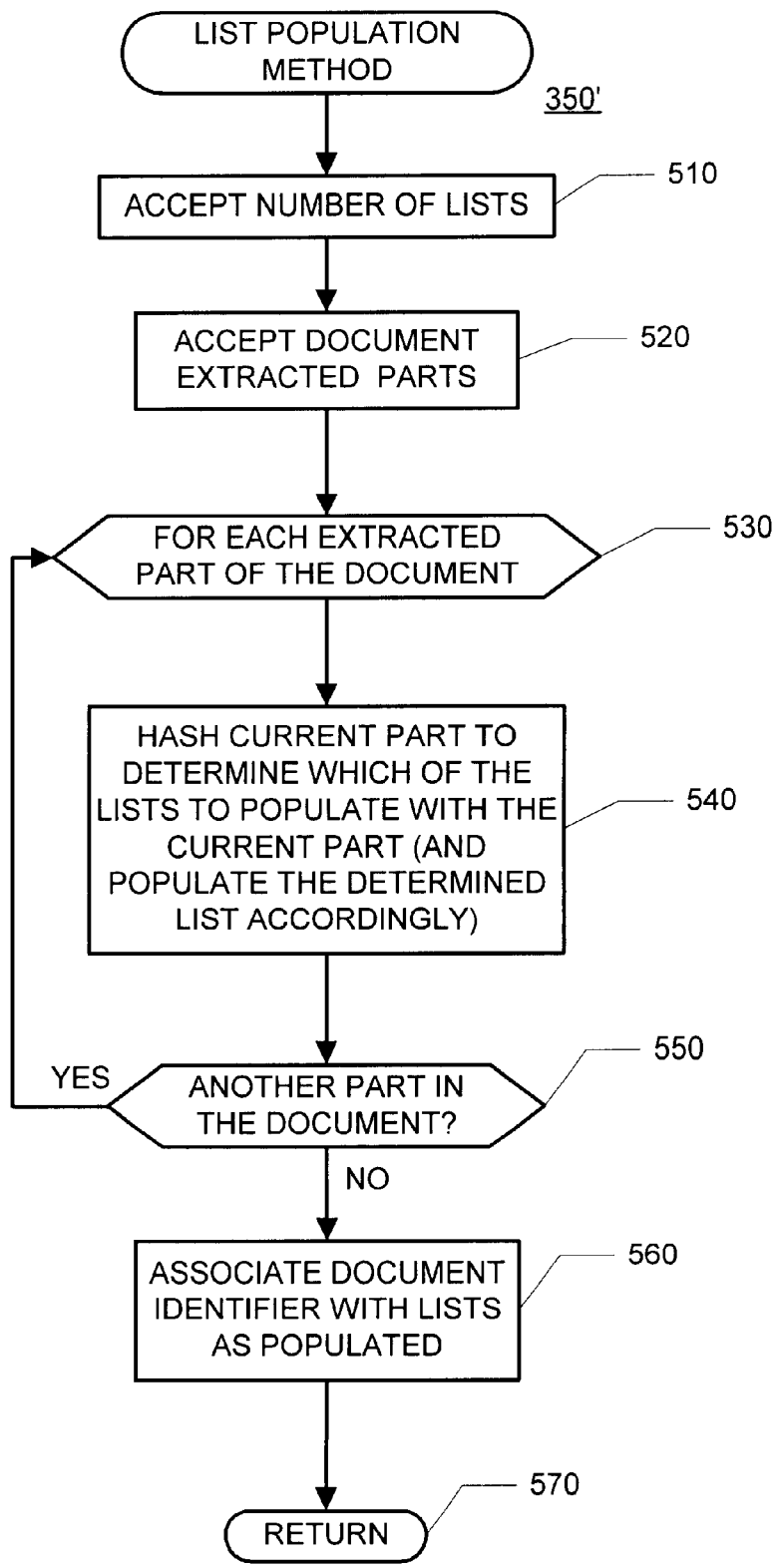
FIG. 5 is a high-level flow diagram of an exemplary method that may be used to effect a list population operation.

FIG. 5 is a high-level flow diagram of an exemplary method 350' that may be used to effect the list population operation 350. As indicated by block 510, a predetermined number of lists to be populated is accepted. This list number parameter (e.g., four) is tunable, but once set, should be applied consistently across all documents to be checked to determine whether or not any are near-duplicates. Further, as indicated by block 520, document parts extracted from a document are accepted. Then, as indicated by the loop 530–550 through all of the accepted parts, a current part is hashed to determine which of the predetermined number of lists to populate with the current part, and to populate the determined list accordingly.

As is well known in the art, hashing functions are used to compress data (e.g., a variable-size input) in a deterministic way, to generate a hash value (e.g., a fixed-size string). That is, given data always hashes to the same hash result.

Hash functions may be one-way (non-reversible). That is, given a hash value, it is impractical to find the data from which the hash value was generated. For purposes of the present invention, the hash function need not be non-reversible.

Hash functions may be strongly collision-free.

That is, for a strongly collision-free hash function H, it is infeasible to find any two different inputs x and y, such that $H(x)=H(y)$. However, for purposes of the present invention, since the number of lists which the hash function is used to populate is rather limited (e.g., four) and is, in any event, much less than the number of possible different document parts (e.g., words or sentences) to be hashed, the hash function used by the list population operation 350 need not be strongly collision-free. Note, however, that ranges of hash values or different hash values can be mapped to a single list.

Once all of the parts are processed by the loop 530–550, as indicated by block 560, the document identifier may be associated with the populated lists before the method 350 is left via RETURN node 570.

Note that as the number of lists increases, the chances of two documents having identical lists increases and consequently, a near-duplicate determination increases. Given this fact, the number of lists to be populated with document elements may be changed and adjusted, as follows, so that two different documents do not share any common fingerprints. If the number "x" of lists increases, the expected number of document differences (or changes from one document to obtain the second document) needed before two documents no longer share any common fingerprints increases.

An exemplary operation of an exemplary list population operation 350 is described in §4.4 below with reference to FIGS. 12A and 12B.

In a more fundamental alternative list population operation, rather than having each part (e.g., word) go into exactly one list, each part (e.g., word) can go into zero, one, or more lists. For each list $L_i$, a separate hash function Hi would be provided for determining whether or not a part (e.g., word) should go into the it list ($L_i$). That is, if $H_i(part_n)$=true, then list $L_i$ would include the $n^{th}$ part ($part_n$). The hash functions for each list should be independent.

In the foregoing alternative list population operation, the hash function and/or the number of lists can be tuned in accordance with the following principles. Assume that the probability that a particular hashing function returns a "true" value in response to a part (e.g., word) is "p". Accordingly, the probability that a particular list will change given the part (e.g., a word) is p, and the probability that the given list will not change given the part (e.g., word) is 1−p. The probability that the given list will not change given a number "k" of parts (e.g., words) is therefore $(1-p)^k$. Conversely, the probability that the given list will change given a number "k" of parts (e.g., words) is $1-(1-p)^k$. If there are x lists, the chance that two documents having k different parts (e.g., words) will have a common list (and therefore share a fingerprint in common, and therefore be considered to be near-duplicates) is $1-(1-(1-p)^k)^x$. The hashing functions (and thus, p) and the number "x" of lists can be adjusted based on the foregoing relationship.

Further note that in the foregoing alternative list population operation, as the number of parts increases (e.g., if the part is a word, then as the number of words in a document increases), the chances of a change to any of the lists increases (assuming a fixed number "x" of lists). Consequently, the chances of determining that two documents are near-duplicates will decrease (assuming a fixed number "x" of lists). To compensate for this sensitivity to document size (or more generally, to the number of parts extracted), the probability(ies) "p" associated with the hash function(s) may be chosen to be determined based on the size of a document. More specifically, by slowly decreasing "p" for larger documents (thereby changing the hashing function Hi as well, so that for larger documents, the set of parts (e.g., words) for which Hi returns "true" is a subset of the set it would return for smaller documents), the ability to find near-duplicate documents could be preserved (or would not degrade, or would not degrade as much). Stated differently, this compensation decreases the probability that a list will change, given larger documents. For example, if for a document of "n" words, it was desired to have a 50% chance that a change of n/10 words would lead to the document not sharing any common fingerprints, the expression:

$$0.5 = 1 - (1 - (1-p)^{(n/10)})^x$$

could be solved for p to get a function for computing p for document size of n that gives the desired results.

§4.3.2.3 EXEMPLARY FINGERPRINT GENERATION METHOD

Figure 6:
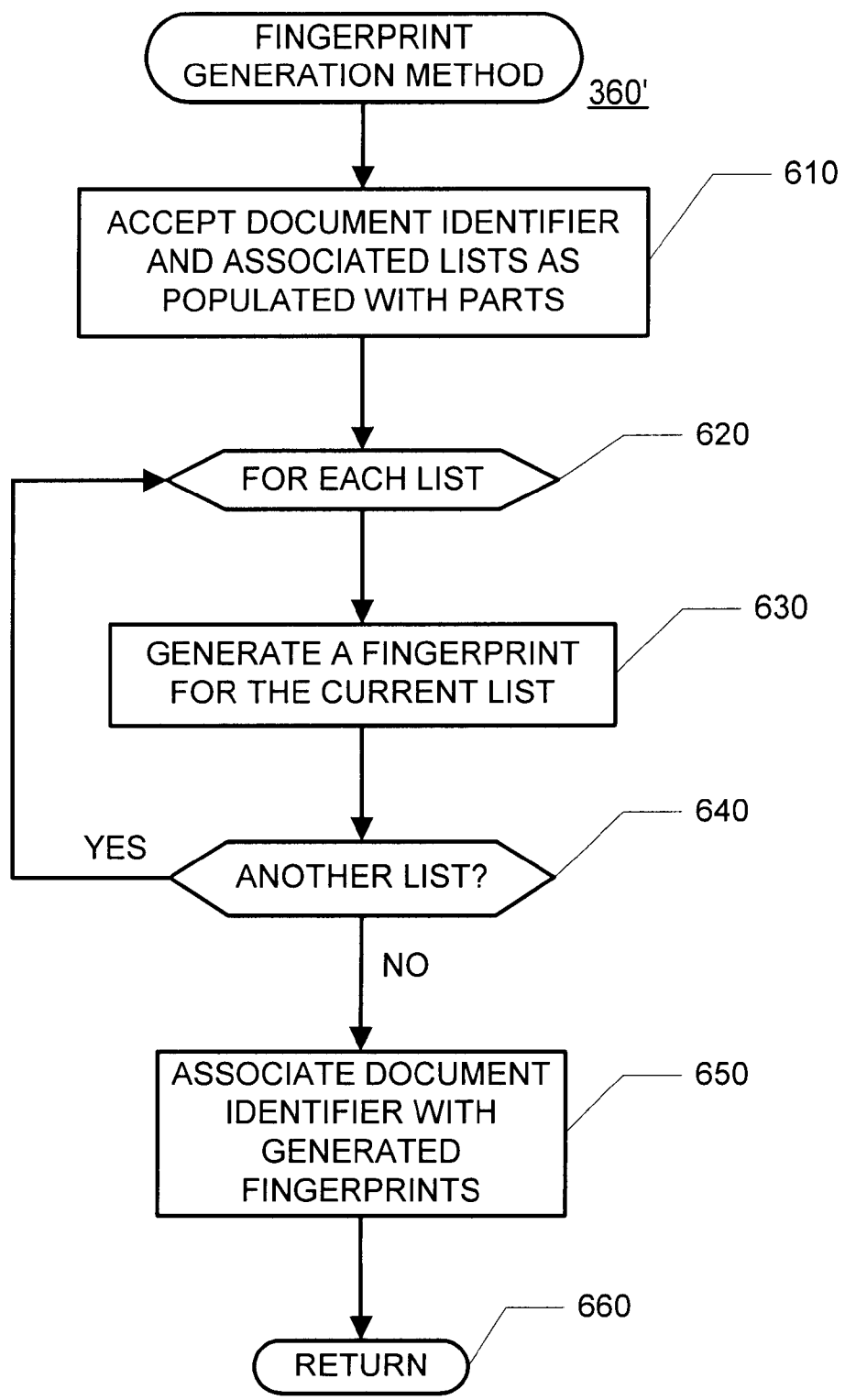
FIG. 6 is a high-level flow diagram of an exemplary method that may be used to effect a fingerprint generation operation.

FIG. 6 is a high-level flow diagram of an exemplary method 360' that may be used to effect the fingerprint generation operation 360. As indicated by block 610, for a given document, the document identifier and its associated lists (as populated with extracted parts) are accepted. Then, as indicated by the loop 620–640 through all of the accepted lists, a fingerprint to the current list is generated (See block 630.). After all of the lists are processed, the document identifier is associated with the generated fingerprints, as indicated in block 650, before the method 360' is left via RETURN node 660.

Referring back to block 630, fingerprinting may simply be a strongly collision-free hashing function, or a hashing function with a low probability of collision. The present invention may use any one of a number of known fingerprinting methods. See, e.g., the article M. O. Rabin, "Fingerprinting by Random Polynomials", *Report TR*-15-81, Center for Research in Computing Technology, Harvard University (1981) (hereafter referred to as "the Rabin article"). See also, the article A. Z. Broder, "Some Applications of Rabin' s Fingerprinting Method," found in the text R. Capocelli et al., editors, *Sequences II: Methods in Communications, Security, and Computer Science*, pp. 143–152, Springer-Verlag (1993) (hereafter referred to as "the Broder Fingerprint article").

The fingerprinting function used for processing lists may be made to be order sensitive (i.e., sensitive to the order of parts (e.g., words) in a list), or not.

§4.3.2.4 EXEMPLARY NEAR-DUPLICATE DETECTION METHOD

Figure 7:
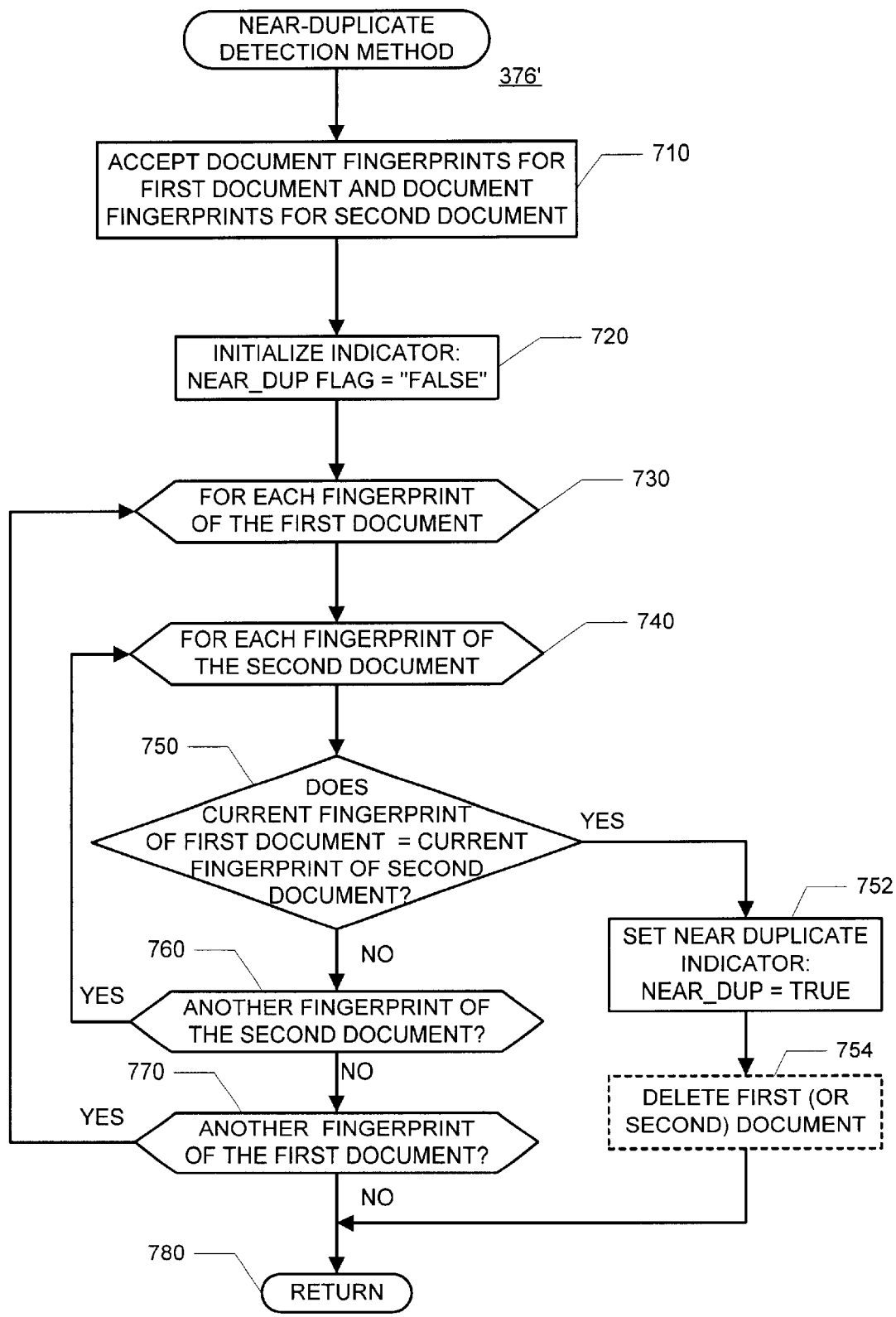
FIG. 7 is a high-level flow diagram of an exemplary method that may be used to effect a near-duplicate detection operation.

FIG. 7 is a high-level flow diagram of an exemplary method 376' that may be used to effect the near-duplicate detection operation 376. This method 376' can be provided with any two documents to be analyzed for purposes of determining whether or not they are near-duplicates. As indicated by block 710, document fingerprints for a first document and those for a second document are accepted. Further, as indicated by block 720, a NEAR_DUP flag may be initialized to "False". Then, as indicated by the loop 740–760 through each fingerprint of the second document, nested within the loop 730–770 through each fingerprint of the first document, the current fingerprints are compared to determine whether or not they match (See decision branch point 750.). If the current fingerprints of the first and second documents match, a near duplicate indicator is set (e.g., the NEAR_DUP flag is set to "True") as indicated by block 752. In one embodiment, one of the two documents may then be deleted as indicated by phantom block 754, before the method 376' is left via RETURN node 780. Referring back to decision branch point 750, if, on the other hand, the current fingerprints of the first and second documents do not match, a next fingerprint of the second document is used, as indicated by loop 740–760. Once all of the fingerprints of the second documents have been tried with a given fingerprint of the first document, a next fingerprint of the first document is used, as indicated by loop 730–770. Once all combinations of the fingerprints of the first and second documents have been tried, the method 376' is left via the RETURN node 780. Note that if no matches are found, the documents are indicated as not being near-duplicates (e.g., NEAR_DUP flag remains set to "False"). A near-duplicate indicator may be provided for each possible pair of documents.

In a collection of documents, a document-fingerprint pair for each of the at least two fingerprints may be generated for each of the documents. Such fingerprint-document pairs may then be sorted based on values of the fingerprints. In this way, only documents with matching fingerprints need be analyzed.

§4.3.2.5 OTHER EXEMPLARY METHODS

Figure 8:
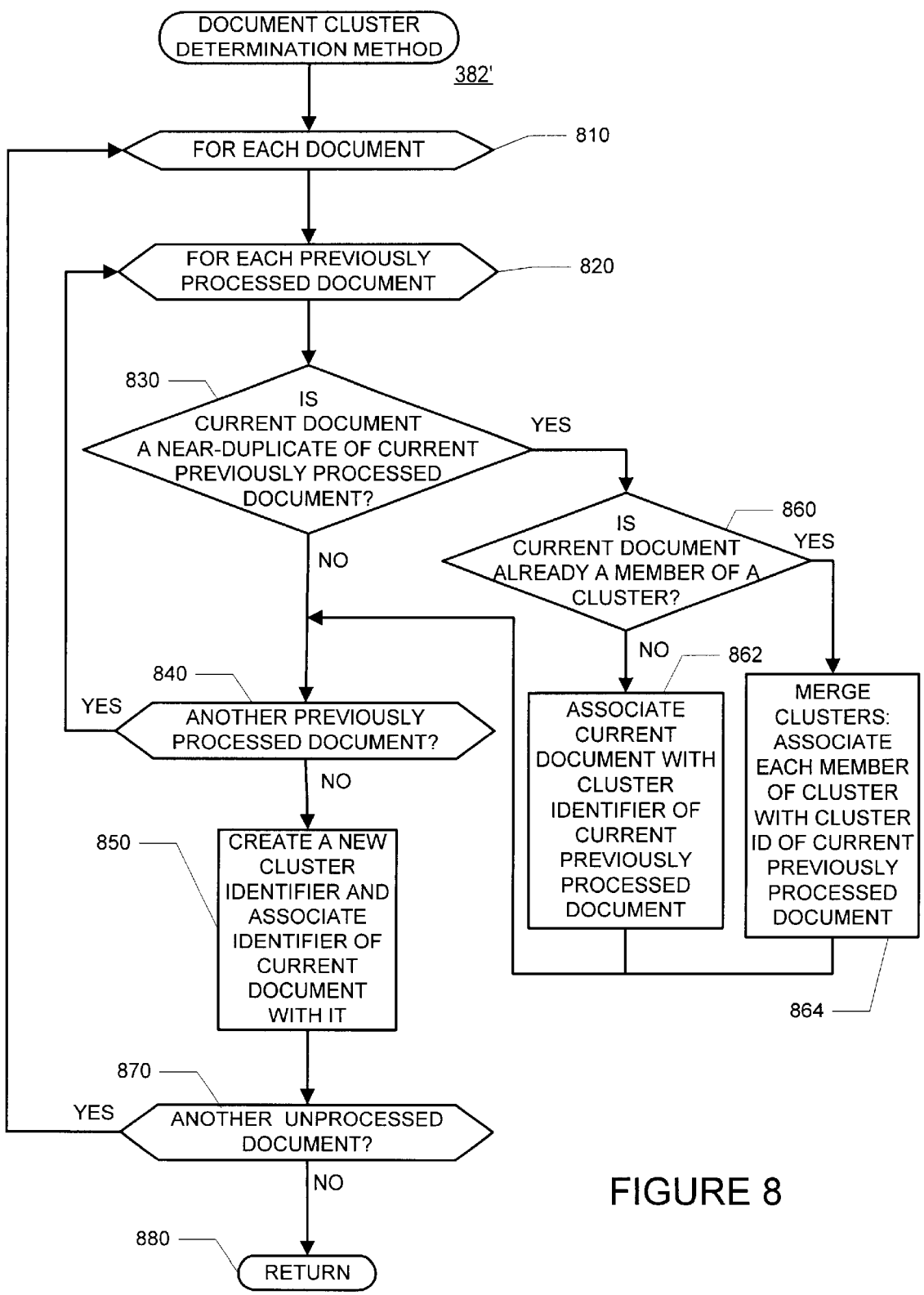
FIG. 8 is a high-level flow diagram of an exemplary method that may be used to effect a cluster determination operation.

FIG. 8 is a high-level flow diagram of an exemplary method 382' that may be used to effect the document cluster determination operation 382'. As indicated by the loop 810–870 through each of the (unprocessed) documents, a number of actions are taken. As indicated by the loop 820–840, nested within loop 810–870, through each previously processed document, it is determined whether or not a current document is a near-duplicate of a current previously processed document (See decision branch point 830.). If so, it is determined whether or not the current document is already a member of a cluster (with other documents), as depicted in conditional branch point 860. If not, the current document is associated with the cluster to which the current previously processed document belongs (e.g., is associated with the cluster ID of the current previously processed document) as indicated by block 862, and the method 382' continues to block 840. If, on the other hand, the current document is already a member of a cluster, then the two clusters are merged (e.g., by associating each member of the cluster to which the current document belongs with the cluster identifier of the current previously processed document), as indicated by block 864, and the method 382' continues to block 840.

Referring back to decision branch point 830, if, on the other hand, the current document is not a near-duplicate of the current previously processed document, as indicated by loop 820–840, a next previously processed document is tried. If, however, there are no more previously processed documents, the current document is associated with a new cluster (e.g., a new cluster identifier is created and the current document is associated with it), as indicated by block 850. Then, another (unprocessed) document is processed as indicated by loop 810–870. If there are no more unprocessed documents, the method 382' is left via RETURN node 880.

Figure 9:
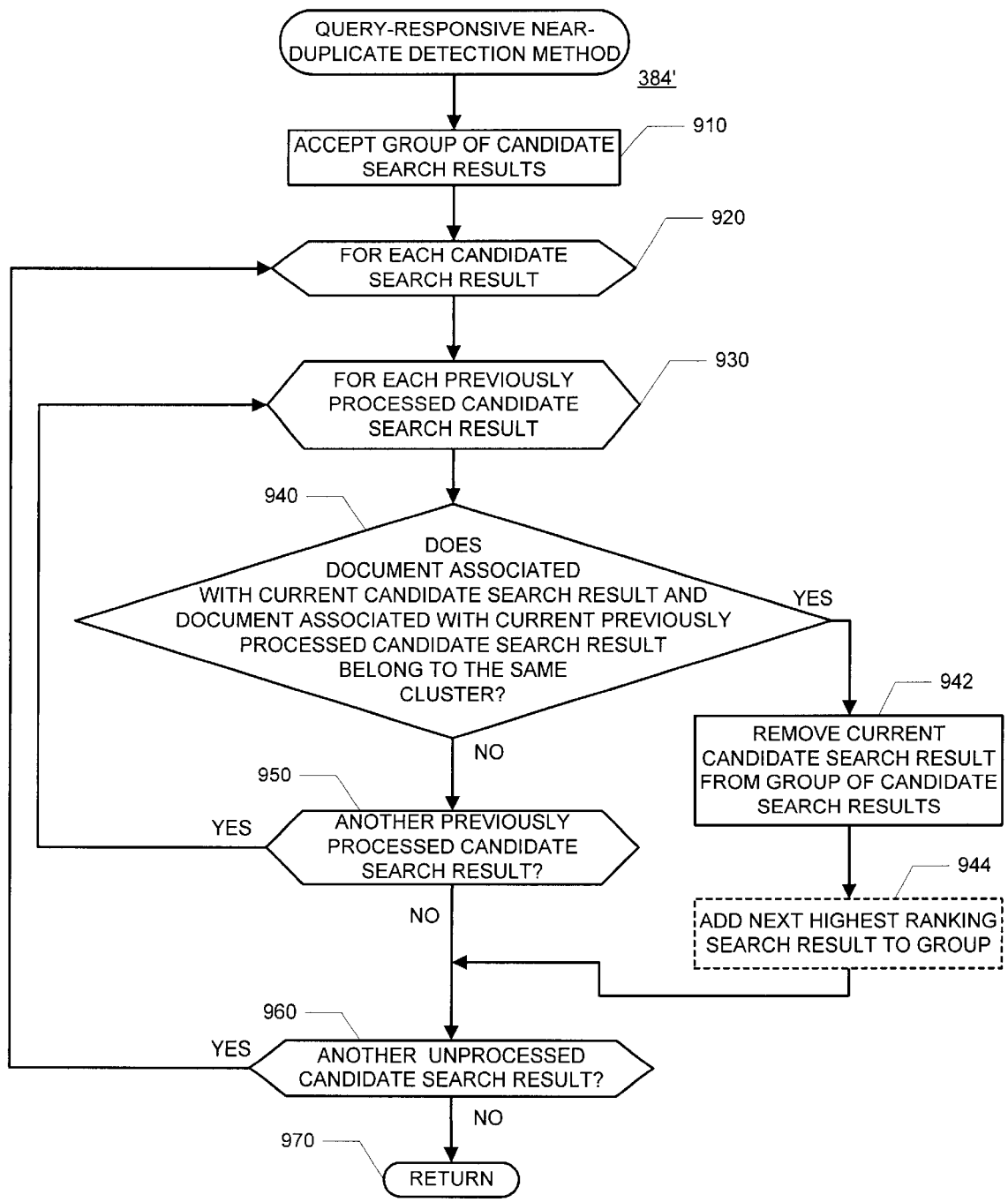
FIG. 9 is a high-level flow diagram of an exemplary method that may be used to effect a query-responsive near-duplicate detection operation.

FIG. 9 is a high-level block diagram of an exemplary method 384' that may be used to effect the query-responsive near-duplicate detection operation 384. As indicated by block 910, a group of candidate search results is accepted (e.g., from a searching operation 230). As indicated by the loop 920–960 through (unprocessed) candidate search results, a number of actions are taken. As indicated by the loop 930–950 through each of the previously processed candidate search results, which is nested within the loop 920–960, it is determined whether or not the document associated with the current candidate search result and the document associated with the current previously processed candidate search result are near-duplicates (e.g., belong to the same cluster) (See decision branch point 940.).

If the document associated with the current candidate search result and the document associated with the current previously processed candidate search result are near-duplicates (e.g., belong to the same cluster), then the current candidate search result is removed from the group of candidate search results as indicated by block 942. As indicated by optional block 944, a next highest ranking candidate search result may be added to the group. Thus, for example, if a search operation returns search results in groups of ten, and if a document associated with a fifth candidate result is a near-duplicate of (e.g., belongs to the same cluster as) a document associated with a second candidate result, the fifth candidate result may be removed (leaving nine candidate results), and a next highest ranking (eleventh) candidate search result may be added to the group (resulting in ten candidate search results). Another (unprocessed) candidate search result is checked as indicated by loop 920–960. If there are no more (unprocessed) candidate search results left, then the method 384' is left via RETURN node 970.

Referring back to conditional branch point 940, if, on the other hand, the current candidate search result and the document associated with the previously processed candidate search result are not near-duplicates (e.g., do not belong to the same cluster), then a next previously processed candidate search result is tried as indicated by loop 930–950. If there are no more previously processed candidate search results left, another (unprocessed) candidate search result is checked as indicated by loop 920–960. If there are no more (unprocessed) candidate search results left, then the method 384' is left via RETURN node 970.

Having described various exemplary methods that may be used to effect various operations, exemplary apparatus for effecting at least some of such operations are described in §4.3.3 below.

§4.3.3 EXEMPLARY APPARATUS

Figure 10:
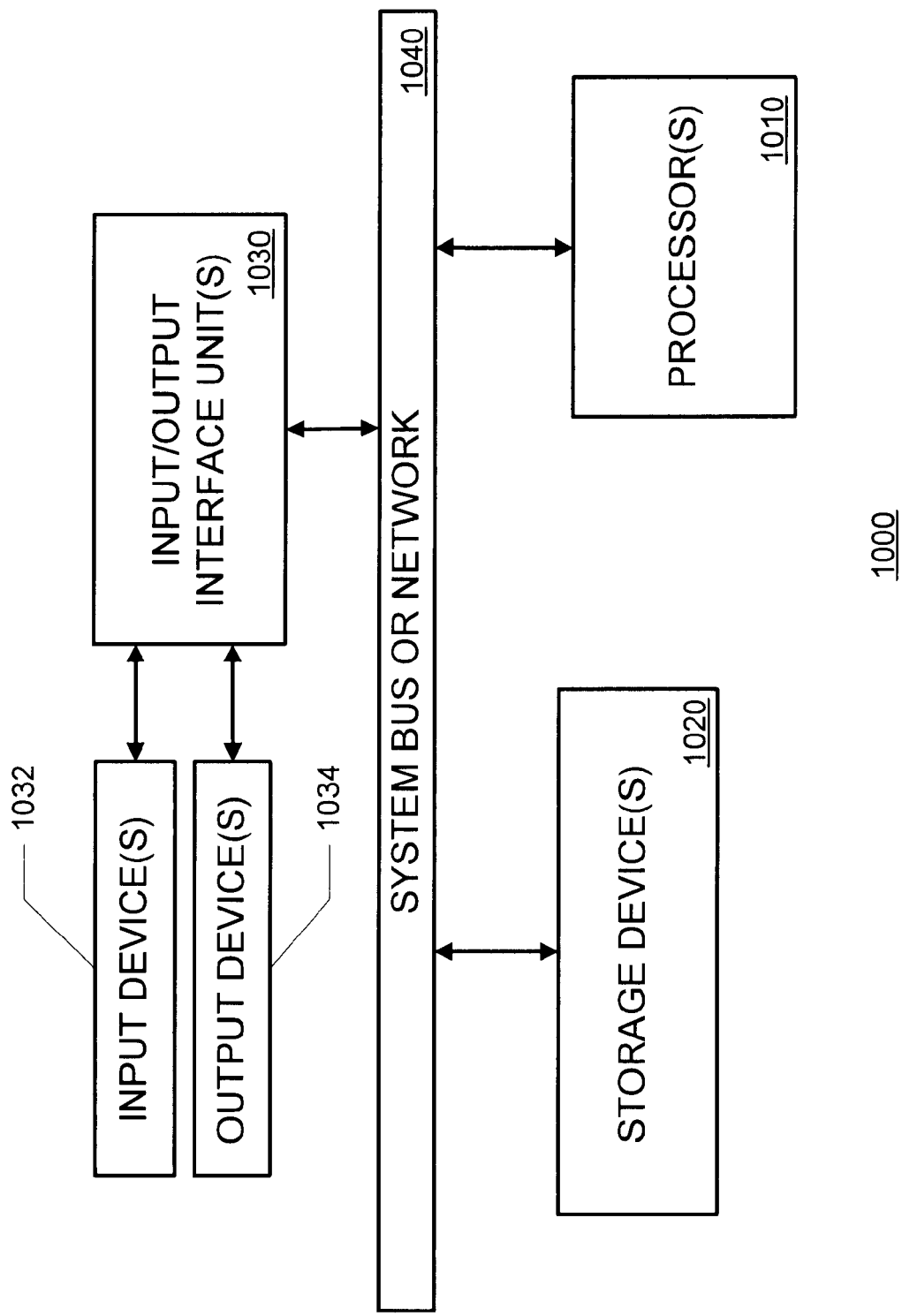
FIG. 10 is a high-level block diagram of a machine that may be used to effect various operations of the present invention.

FIG. 10 is high-level block diagram of a machine 1000 that may effect one or more of the operations discussed above. The machine 1000 basically includes a processor(s) 1010, an input/output interface unit(s) 1030, a storage device(s) 1020, and a system bus or network 1040 for facilitating the communication of information among the coupled elements. An input device(s) 1032 and an output device(s) 1034 may be coupled with the input/output interface(s) 1030.

The processor(s) 1010 may execute machine-executable instructions (e.g., C or C++ running on the Solaris operating system available from Sun Microsystems Inc. of Palo Alto, California or the Linux operating system widely available from a number of vendors such as Red Hat, Inc. of Durham, North Carolina) to effect one or more aspects of the present invention. At least a portion of the machine executable instructions may be stored (temporarily or more permanently) on the storage device(s) 1020 and/or may be received from an external source via an input interface unit 1030.

Some aspects of the present invention may be effected in the general context of computer-executable instructions, such as program modules, being executed by a personal computer. However, the methods of the present invention may be effected by (and the data structures of the present invention may be stored on) other apparatus. Program modules may include routines, programs, objects, components, data structures, etc. that perform an operation(s) or implement particular abstract data types. Moreover, those skilled in the art will appreciate that at least some aspects of the present invention may be practiced with other configurations, including hand-held devices, multiprocessor systems, microprocessor-based or programmable consumer electronics, network computers, minicomputers, set-top boxes, mainframe computers, and the like. At least some aspects of the present invention may also be practiced in distributed computing environments where tasks are performed by remote processing devices linked through a communications network. In a distributed computing environment, program modules may be located in local and/or remote memory storage devices.

In one embodiment, the machine 1000 may be one or more conventional personal computers. In this case, the processing unit(s) 1010 may be one or more microprocessors, the bus 1040 may include a system bus that couples various system components including a system memory to the processing unit(s). The system bus 1040 may be any of several types of bus structures including a memory bus or memory controller, a peripheral bus, and a local bus using any of a variety of bus architectures. The storage devices 1020 may include system memory, such as read only memory (ROM) and/or random access memory (RAM). A basic input/output system (BIOS), containing basic routines that help to transfer information between elements within the personal computer, such as during start-up, may be stored in ROM. The storage device(s) 1020 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media. The hard disk drive, magnetic disk drive, and (magneto-) optical disk drive may be coupled with the system bus 1040 by a hard disk drive interface, a magnetic disk drive interface, and an (magneto-) optical drive interface, respectively. The drives and their associated storage media may provide nonvolatile storage of machine-readable instructions, data structures, program modules and other data for the personal computer. Although the exemplary environment described herein employs a hard disk, a removable magnetic disk and a removable optical disk, those skilled in the art will appreciate that other types of storage media (with appropriate interface devices), may be used instead of, or in addition to, the storage devices introduced above.

A user may enter commands and information into the personal computer through input devices 1032, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 1010 through a serial port interface 1030 coupled to the system bus 1040. Input devices may be connected by other interfaces 1030, such as a parallel port, a game port or a universal serial bus (USB). However, in the context of a search facility 130, no input devices, other than those needed to accept queries, and possibly those for system administration and maintenance, are needed.

The output device(s) 1034 may include a monitor or other type of display device, which may also be connected to the system bus 1040 via an interface 1030, such as a video adapter for example. In addition to (or instead of) the monitor, the personal computer may include other (peripheral) output devices (not shown), such as speakers and printers for example. Again, in the context of a search facility 130, no output devices, other than those needed to communicate query results, and possibly those for system administration and maintenance, are needed.

The computer may operate in a networked environment which defines logical and/or physical connections to one or more remote computers, such as a remote computer. The remote computer may be another personal computer, a server, a router, a network computer, a peer device or other common network node, and may include many or all of the elements described above relative to the personal computer. The logical and/or physical connections may include a local area network (LAN) and a wide area network (WAN). An intranet and the Internet may be used instead of, or in addition to, such networks.

When used in a LAN, the personal computer may be connected to the LAN through a network interface adapter (or "NIC") 1030. When used in a WAN, such as the Internet, the personal computer may include a modem or other means for establishing communications over the wide area network. In a networked environment, at least some of the program modules depicted relative to the personal computer may be stored in the remote memory storage device. The network connections shown are exemplary and other means of establishing a communications link between the computers may be used.

Referring once again to FIG. 1, the information access facility 110 may be a personal computer, the browsing operation 112 may be an Internet browser such as Explorer from Microsoft Corporation or Netscape from Sun Microsystems, and the input/output interface operation(s) 118 may include communications software and hardware. Other information access facilities 110 may be untethered devices such as mobile telephones, personal digital assistants, etc., or other information appliances such as set-top boxes, network appliances, etc.

§4.4 EXAMPLES OF OPERATIONS OF EXEMPLARY EMBODIMENT

Examples of operations of an exemplary embodiment of the present invention is now described with reference to FIGS. 11 through 18.

Figure 11:
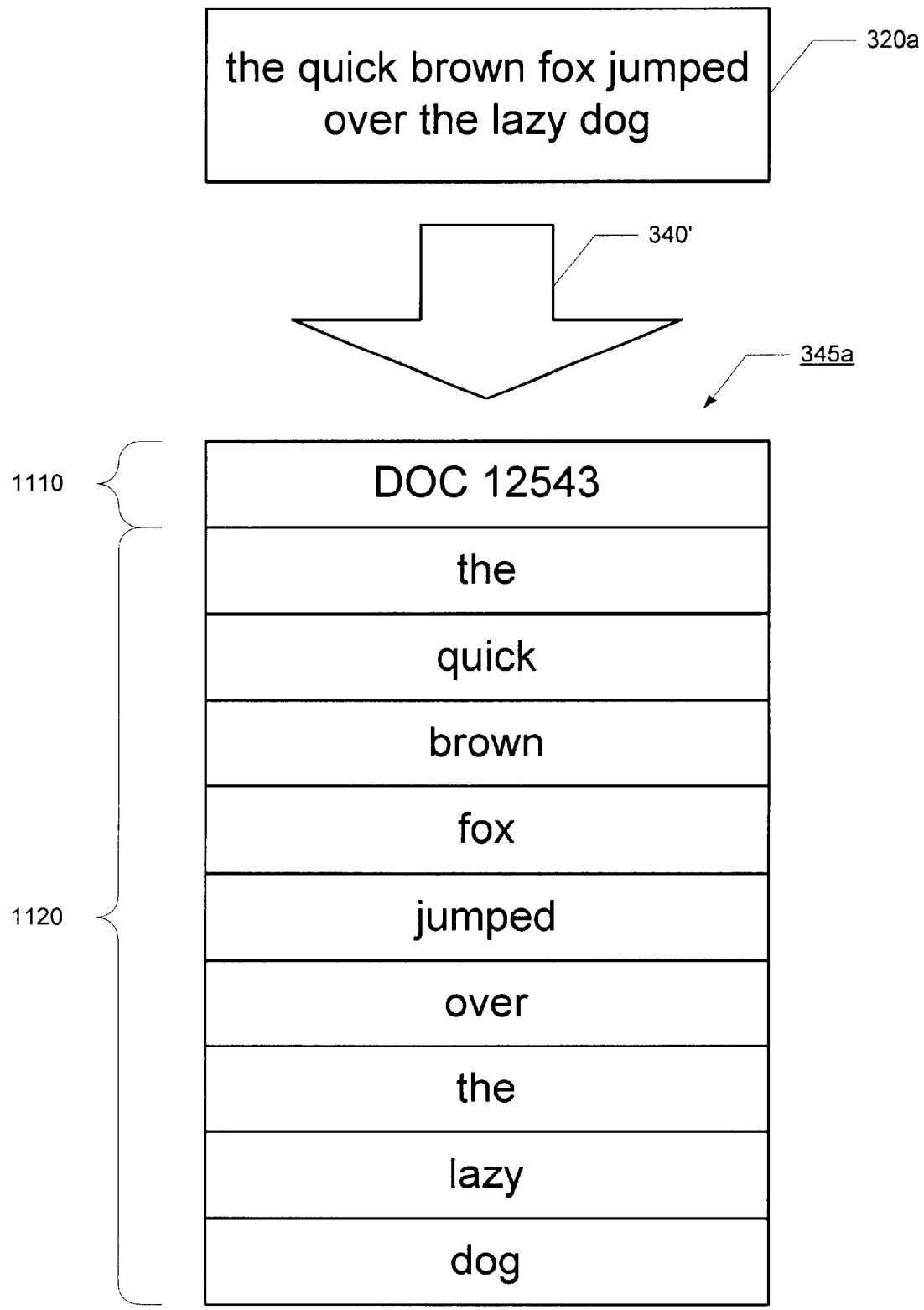
FIG. 11 is an example illustrating an operation of an exemplary extraction operation.

FIG. 11 is an example illustrating an operation of an exemplary extraction operation. A document 320a is shown in canonical form. An extraction operation 340' uses a "word" unit type, a part size of one word, and no (zero word) overlap. As shown, the extraction operation 340' returns document extracted parts 345a including a document identifier 1110 and parts 1120.

In another example, suppose that the document is "ABCDE", a "character" unit type is used, a part size is three characters, and an overlap is one character. In this second example, the extracted parts would be "ABC", "BCD" and "CDE".

FIGS. 12A and 12B, collectively, provide an example illustrating an operation of an exemplary list population operation 350'. In this example, the number of lists is set to four, the document parts extracted in the example of FIG. 11 are processed, and each part goes to one and only one list. FIG. 12A illustrates the four lists 1220 as populated after four parts (e.g., words) have been processed. Note that a document identifier 1210 is associated with the lists. FIG. 12B illustrates the four lists 1220' as populated after eight parts (e.g., words) have been processed. Note that since the (e.g., hashing) process used to determine which list the part is to be sent is repeatable and not sensitive to state, the second "the" part is sent to the same list 1220c' as the first "the" part.

Figure 14:
Figure 15:
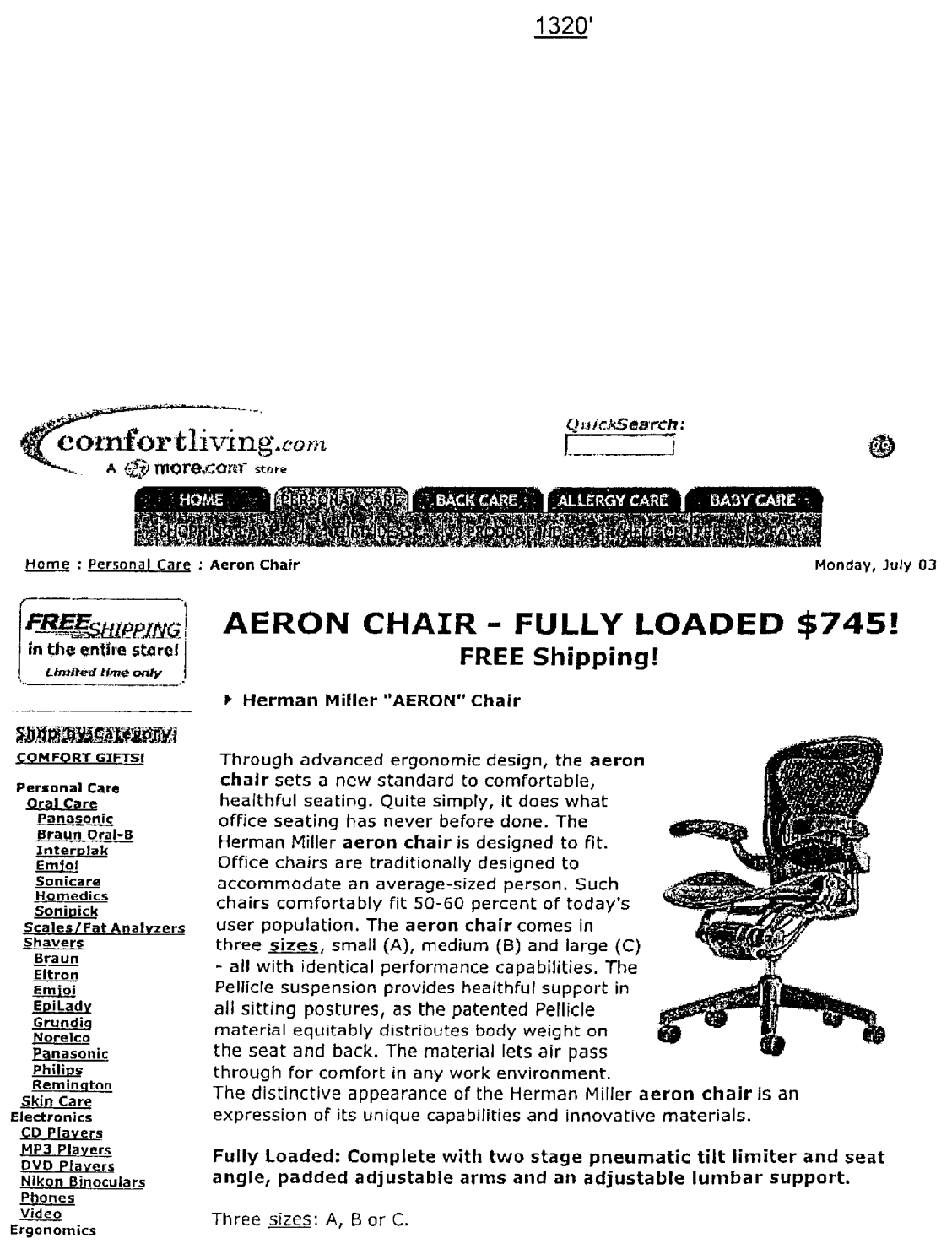

FIG. 13 illustrates a Web page 1300 of eight results 1310–1380 to a search query 1390. In this example, the search results 1310–1380 include a title of a corresponding document, a hyper-text link to the corresponding document, and snippets from the corresponding document. These search results 1310–1380 would be returned (and rendered to an end-user) if a query-responsive near-duplicate detection operation were not used. FIG. 14 illustrates the document (e.g., Web page) 1310' associated with the first search result 1310, FIG. 15 illustrates the document (e.g., Web page) 1320' associated with the second search result 1320, FIG. 16 illustrates the document (e.g., Web page) 1330' associated with the third search result 1330, FIG. 17 illustrates a document (e.g., Web page) 1340' associated with the fourth search result 1340, and FIG. 18 illustrates a document (e.g., Web page) 1350' associated with a fifth search result 1350. Clearly, these five documents are near-duplicates of one another. Most users would not want to see the others after seeing one, since no additional useful information would be conveyed. Indeed, these documents (Web pages) differ only in the date the page was retrieved (e.g., by a crawler operation 202) ("Monday, July 3", or "Tuesday, July 4") the category for the page ("Home: Personal Care: Aeron Chair", or "Home: Back Care: Chairs: Aeron Chair"), and/or the title ("aeron chai.aeron, aerons, ergonomic chairs", or "Herman Miller AERON Chair from AHC.herman, miller"). An exemplary query-responsive near-duplicate detection method 384' could be used to remove, the second 1320, third 1330, fourth 1340, and fifth 1350 candidate search results and add other search results to the group of search results to be returned (and rendered to the end-user).

§4.5 CONCLUSIONS

As can be appreciated from the foregoing, improved near-duplicate detection techniques are disclosed. These near-duplicate detection techniques are robust, and reduce processing and storage requirements. Such reduced processing and storage requirements is particularly important when processing large document collections.

The near-duplicate detection techniques have a number of important practical applications. In the context of a search engine for example, these techniques can be used during a crawling operation to speed-up the crawling and to save bandwidth by not crawling near-duplicate Web pages or sites, as determined from documents uncovered in a previous crawl. Further, by reducing the number of Web pages or sites crawled, these techniques can be used to reduce storage requirements of a repository, and therefore, other downstream stored data structures. These techniques can instead be used later, in response to a query, in which case a user is not annoyed with near-duplicate search results. These techniques may also he used to "fix" broken links. That is, if a document (e.g., a Web page) doesn't exist (at a particular location or URL) anymore, a link to a near-duplicate page can be provided.

What is claimed is:

1. A method for determining whether documents, in a large collection of documents, are near-duplicates, the method comprising:

a) for each of at least some of the documents in the large collection of documents, generating at least two fingerprints;

b) preprocessing the fingerprints to identify any fingerprints that are associated with only one document; and c) determining whether or not documents are near-duplicate documents based on fingerprints other than those identified as being associated with only one document.

2. The method of claim 1 wherein the act of determining whether or not documents are near-duplicate documents includes:

i) for any two documents, determining whether or not any fingerprints of a first of the two documents matches any fingerprints of a second of the two documents, and ii) if it is determined that a fingerprint of the first of the two documents does match a fingerprint of the second of the two documents, then concluding that the two documents are near-duplicates.

3. The method of claim 1 wherein the act of generating at least two fingerprints for each of the documents includes:

i) extracting parts from the document, ii) hashing each of the extracted parts to generate a hash value for each of the extracted parts, iii) populating a predetermined number of lists with the extracted parts based on their respective hash values, and iv) for each of the predetermined number of lists, determining a fingerprint based on the contents of the list.

4. The method of claim 3 wherein the act of hashing each of the extracted parts to generate a hash value for each of the extracted parts uses a hash function that is repeatable, deterministic and not sensitive to state.

5. The method of claim 3 wherein the parts extracted from the document are selected from a group of parts consisting of characters, words, sentences, paragraphs and sections.

6. The method of claim 3 wherein the parts extracted from the document do not overlap.

7. The method of claim 3 wherein the parts extracted from the document overlap.

8. The method of claim 3 wherein each of the acts of determining a fingerprint uses a hashing function with a low probability of collision.

9. The method of claim 3 wherein the act of determining a fingerprint uses a function that is sensitive to an order of the parts within a list.

10. The method of claim 3 wherein the act of determining a fingerprint uses a function that is insensitive to an order of the parts within a list.

11. An apparatus for determining whether documents, in a large collection of documents, are near-duplicates, the apparatus comprising:

a) a fingerprint generator for generating, for each of the documents in the large collection of documents, at least two fingerprints;

b) a preprocessor for identifying any fingerprints that are associated with only one document; and c) a fingerprint comparison facility for determining whether or not documents are near-duplicate documents based on fingerprints other than those identified as being associated with only one document.

12. The apparatus of claim 11 wherein the fingerprint generator includes:

i) an extractor for extracting parts from the document, ii) a hashing facility for hashing each of the extracted parts to generate a hash value for each of the extracted parts, iii) list population facility for populating a predetermined number of lists with the extracted parts based on their respective hash values, and iv) means for determining a fingerprint for each of the predetermined number of lists, based on the contents of the list.

13. A method for clustering documents, the method comprising:

a) for each of the documents, generating at least two fingerprints; and b) for each of the documents, i) determining whether or not the document is a near-duplicate of any of previously processed documents, based on fingerprints of the documents, ii) if it is determined that the document is not a near-duplicate of any previously processed document, then associating the document with a unique cluster identifier, and iii) if it is determined that the document is a near-duplicate of a previously processed document, then associating the document with a cluster identifier associated with the previously processed document.

14. A method for filtering search results to remove near-duplicates, the method comprising:

a) for each of a predetermined number of candidate search results, determining whether the candidate search result is a near-duplicate of another candidate search result; and b) if it is determined that the candidate search result is a near-duplicate of another candidate search result, then rejecting the candidate search result wherein the act of determining whether a candidate search result is a near-duplicate of another candidate search result includes i) comparing a cluster identifier of the candidate search result with that of the other candidate search result, and ii) if the cluster identifiers of the two candidate search results match, then concluding that the two candidate search results are near-duplicates, and wherein cluster identifiers of the candidate search results are assigned by:

i) determining whether or not a document corresponding to the candidate search result is a near-duplicate of any of previously processed documents, ii) if it is determined that the document corresponding to the candidate search result is not a near-duplicate of any previously processed document, then associating the document with a unique cluster identifier, and iii) if it is determined that the document corresponding to the candidate search result is a near-duplicate of a previously processed document, then associating the document corresponding to the candidate search result with a cluster identifier associated with the previously processed document.

15. A method for determining whether two documents are near-duplicates, the method comprising:
   a) for each of the two documents, generating at least two fingerprints by
      i) extracting parts from the document,
      ii) hashing each of the extracted parts to generate a hash value for each of the extracted parts,
      iii) populating at least two lists with the extracted parts based on their respective hash values, and
      iv) for each of the predetermined number of lists, determining a fingerprint based on the contents of the list; and
   b) determining whether or not the two documents are near-duplicate documents based on their fingerprints.

16. The method of claim 15 wherein the act of determining whether or not the two documents are near-duplicate documents includes:
   i) determining whether or not any fingerprints of a first of the two documents matches any fingerprints of a second of the two documents, and
   ii) if it is determined that a fingerprint of the first of the two documents does match a fingerprint of the second of the two documents, then concluding that the two documents are near-duplicates.

17. The method of claim 15 wherein the act of hashing each of the extracted parts to generate a hash value for each of the extracted parts uses a hash function that is repeatable, deterministic and not sensitive to state.

18. The method of claim 15 wherein the parts extracted from the document are selected from a group of parts consisting of characters, words, sentences, paragraphs and sections.

19. The method of claim 15 wherein the parts extracted from the document do not overlap.

20. The method of claim 15 wherein the parts extracted from the document overlap.

21. The method of claim 15 wherein the act of determining a fingerprint uses a hashing function with a low probability of collision.

22. The method of claim 15 wherein the act of determining a fingerprint uses a function that is sensitive to an order of the parts within a list.

23. The method of claim 15 wherein the act of determining a fingerprint uses a function that is insensitive to an order of the parts within a list.

24. A method, for use in a crawling facility, for reducing processing and bandwidth used, the method comprising:
   a) for each of the documents, generating at least two fingerprints by
      i) extracting parts from the document,
      ii) hashing each of the extracted parts to generate a hash value for each of the extracted parts,
      iii) populating at least two lists with the extracted parts based on their respective hash values, and
      iv) for each of the predetermined number of lists, determining a fingerprint based on the contents of the list;

b) determining whether or not the two documents are near-duplicate documents based on their fingerprints; and
   c) if it is determined that the two documents are near-duplicates, then indicating that one of the two documents is not to be processed during a subsequent crawl.

25. A method for treating broken links to document, the method comprising:
   a) determining whether a link to a first document is broken;
   b) if it is determined that a link to a first document is broken, determining whether there exists a second document that is a near-duplicate of the first document; and
   c) if it is determined that there exists a second document that is a near-duplicate of the first document, then replacing the broken link to the first document with a link to the second document,
      wherein the act of determining whether or not there exists a second document is a near-duplicate of the first document is performed by:
      i) for each of the documents, generating at least two fingerprints by
         A) extracting parts from the document,
         B) hashing each of the extracted parts to generate a hash value for each of the extracted parts,
         C) populating at least two lists with the extracted parts based on their respective hash values, and
         D) for each of the predetermined number of lists, determining a fingerprint based on the contents of the list; and
      ii) determining whether or not the two documents are near-duplicate documents based on their fingerprints.

26. An apparatus for determining whether two documents are near-duplicates, the apparatus comprising:
   a) a fingerprint generator for generating at least two fingerprints for each of the two documents, the fingerprint generator including
      i) an extractor for extracting parts from the document,
      ii) a hashing facility for hashing each of the extracted parts to generate a hash value for each of the extracted parts,
      iii) a list population facility for populating at least two lists with the extracted parts based on their respective hash values, and
      iv) means for determining, for each of the predetermined number of lists, a fingerprint based on the contents of the list; and
   b) a comparison facility for determining whether or not the two documents are near-duplicate documents based on their fingerprints.

27. An improved crawling facility, for reducing processing and bandwidth used, the crawling facility comprising:
   a) a fingerprint generator for generating, for each of the documents, at least two fingerprints, the fingerprint generator including
      i) an extractor for extracting parts from the document,
      ii) a hashing facility for hashing each of the extracted parts to generate a hash value for each of the extracted parts,
      iii) a list population facility for populating at least two lists with the extracted parts based on their respective hash values, and
      iv) means for determining, for each of the predetermined number of lists, a fingerprint based on the contents of the list;

b) a comparison facility for determining whether or not the two documents are near-duplicate documents based on their fingerprints; and c) a document processor, wherein if it is determined that the two documents are near-duplicates, then the document processor indicates that one of the two documents is not to be processed during a subsequent crawl.

28. A machine-readable medium having stored thereon machine-executable instructions which, when executed by a machine:

a) extract parts from a document,
   ii) hash each of the extracted parts to generate a hash value for each of the extracted parts,
   iii) populate a predetermined number of lists with the extracted parts based on their respective hash values, and
   iv) for each of the predetermined number of lists, determine a fingerprint based on the contents of the list.

29. A method for generating at least two fingerprints for a document comprising:

a) extracting parts from the document;

b) hashing each of the extracted parts to generate a hash value for each of the extracted parts;

c) populating a predetermined number of lists with the extracted parts based on their respective hash values; and d) for each of the predetermined number of lists, determining a fingerprint based on the contents of the list.

30. The method of claim 29 wherein each of the lists has an associated hashing function, wherein each of the extracted parts can be contained in none of the lists, one of the lists, or more of the lists based on the hash functions for the lists.

31. The method of claim 30 wherein for each hash function is dynamically adjusted such that the probability that the hash function will populate its associated list with a part decreases as the size of the document increases.

32. A method comprising:

a) determining whether there exists a second document that is a near-duplicate of a first document; and b) indexing the first document but not the second document, wherein the act of determining whether or not there exists a second document is a near-duplicate of the first document is performed by:
   i) for each of the documents, generating at least two fingerprints by
      A) extracting parts from the document,
      B) hashing each of the extracted parts to generate a hash value for each of the extracted parts,
      C) populating at least two lists with the extracted parts based on their respective hash values, and
      D) for each of the predetermined number of lists, determining a fingerprint based on the contents of the list; and
   ii) determining whether or not the two documents are near-duplicate documents based on their fingerprints.

33. A method for determining whether two objects are near-duplicates, the method comprising:

a) for each of the two objects, generating at least two fingerprints by
   i) extracting features from the object,
   ii) hashing each of the extracted features to generate a hash value for each of the extracted features,
   iii) populating at least two lists with the extracted features based on their respective hash values, and
   iv) for each of the predetermined number of lists, determining a fingerprint based on the contents of the list; and b) determining whether or not the two objects are near-duplicates based on their fingerprints.

34. The method of claim 33 wherein each of the two objects is a word, and wherein the extracted features define context vectors.

35. The method of claim 33 wherein each of the two objects is a word, and wherein, in each case, the extracted features are words that frequently occur in close proximity to the word.

36. The method of claim 33 wherein the two objects are words, and wherein if the two objects are determined to be near duplicates, then determining the two words to be synonyms.

37. A method for determining whether a first document and a second document in a collection of documents are near-duplicates, the method comprising:

a) for each of the documents in the collection of documents, generating at least two fingerprints; and b) concluding that the first and second documents are near-duplicates if any one of the at least two fingerprints of the first document matches any one of the at least two fingerprints of the second document, wherein documents in the collection of documents without any common fingerprints are not checked to determine whether or not they are near duplicates.

38. The method of claim 37 further comprising:

a2) for each of the documents in the collection of documents, generating a document-fingerprint pair for each of the at least two fingerprints; and a3) sorting the fingerprint-document pairs based on values of the fingerprints.

* * * * *